US012055975B2

(12) United States Patent
Cho et al.

(10) Patent No.: US 12,055,975 B2
(45) Date of Patent: Aug. 6, 2024

(54) ELECTRONIC DEVICE INCLUDING ROLLER

(71) Applicant: Samsung Electronics Co., Ltd., Gyeonggi-do (KR)

(72) Inventors: Hyunje Cho, Gyeonggi-do (KR); Jiwoo Lee, Gyeonggi-do (KR); Gun Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/524,806

(22) Filed: Nov. 12, 2021

(65) Prior Publication Data

US 2022/0147104 A1 May 12, 2022

Related U.S. Application Data

(63) Continuation of application No. PCT/KR2021/016538, filed on Nov. 12, 2021.

(30) Foreign Application Priority Data

Nov. 12, 2020 (KR) .................. 10-2020-0150665

(51) Int. Cl.
G06F 1/16 (2006.01)
(52) U.S. Cl.
CPC .......... *G06F 1/1652* (2013.01); *G06F 1/1601* (2013.01); *G06F 1/1681* (2013.01)

(58) Field of Classification Search
CPC .... G06F 1/1652; G06F 1/1601; G06F 1/1681; G06F 1/16; G06F 1/1624; G06F 1/1637; G06F 1/1662; G06F 1/1666; G06F 1/1628; G06F 1/1647
See application file for complete search history.

(56) References Cited

U.S. PATENT DOCUMENTS

| | | | | |
|---|---|---|---|---|
| 8,457,690 B2* | 6/2013 | Ozawa | .................. | G06F 1/1647 |
| | | | | 455/575.8 |
| 9,519,313 B2* | 12/2016 | Kim | ........................ | G06F 1/166 |
| 10,101,019 B2* | 10/2018 | Jahng | ..................... | G09F 9/301 |
| 10,152,086 B2* | 12/2018 | Choi | ....................... | G09F 9/301 |

(Continued)

FOREIGN PATENT DOCUMENTS

| CN | 106991921 A | 7/2017 |
|---|---|---|
| CN | 110111692 A | 8/2019 |

(Continued)

OTHER PUBLICATIONS

International Search Report dated Feb. 16, 2022.
European Search Report dated Jan. 8, 2024.

*Primary Examiner* — Sagar Shrestha
(74) *Attorney, Agent, or Firm* — Cha & Reiter, LLC

(57) ABSTRACT

According to certain embodiments of the disclosure, an electronic device may include: a housing, a roller disposed in the housing, a first cover part configured to be detachable from the housing, a second cover part configured to be detachable from the housing, and a display including a first display area including a first end coupled with the first cover part, and a second display area including a second end coupled with the second cover part, wherein at least a portion of the first display area is configured to be wound around the roller while facing at least a portion of the second display area.

15 Claims, 16 Drawing Sheets

(56) References Cited

U.S. PATENT DOCUMENTS

| | | | |
|---|---|---|---|
| 10,757,823 B2* | 8/2020 | Park | G06F 1/1626 |
| 11,720,147 B2* | 8/2023 | Prushinskiy | G06F 1/1624 |
| | | | 361/679.27 |
| 2005/0146498 A1 | 7/2005 | Hemia et al. | |
| 2006/0192726 A1* | 8/2006 | Huitema | G06F 1/1679 |
| | | | 345/1.1 |
| 2007/0153461 A1 | 7/2007 | Singh et al. | |
| 2008/0144265 A1* | 6/2008 | Aoki | G06F 1/1601 |
| | | | 361/679.04 |
| 2013/0128439 A1* | 5/2013 | Walters | G06F 1/1624 |
| | | | 361/679.04 |
| 2014/0092566 A1* | 4/2014 | Shirasaka | H05K 5/0017 |
| | | | 361/749 |
| 2014/0247544 A1* | 9/2014 | Ryu | G09F 15/0062 |
| | | | 361/679.01 |
| 2016/0170450 A1* | 6/2016 | Kim | G06F 1/166 |
| | | | 361/807 |
| 2016/0187929 A1* | 6/2016 | Kim | G06F 1/1643 |
| | | | 345/184 |
| 2016/0216737 A1* | 7/2016 | Hayk | G06F 1/1626 |
| 2017/0156225 A1* | 6/2017 | Heo | G06F 1/1681 |
| 2018/0110137 A1 | 4/2018 | Kim et al. | |
| 2019/0155476 A1 | 5/2019 | Kim et al. | |
| 2019/0258295 A1 | 8/2019 | Fujimoto | |
| 2019/0387633 A1* | 12/2019 | Liao | H05K 5/0017 |
| 2020/0314552 A1* | 10/2020 | Kim | H04R 7/045 |
| 2021/0090476 A1* | 3/2021 | Kang | G06F 1/1652 |
| 2022/0253104 A1* | 8/2022 | Luo | G06F 1/1652 |
| 2022/0308632 A1* | 9/2022 | Ivanov | G06F 1/16 |

FOREIGN PATENT DOCUMENTS

| | | |
|---|---|---|
| EP | 3 565 223 A1 | 11/2019 |
| KR | 10-2005-0119296 A | 12/2005 |
| KR | 10-1570869 B1 | 11/2015 |
| KR | 10-2016-0011718 A | 2/2016 |
| KR | 10-2016-0059036 A | 5/2016 |
| KR | 10-2016-0129669 A | 11/2016 |
| KR | 10-2017-0014055 A | 2/2017 |
| KR | 10-2018-0042516 A | 4/2018 |
| TW | I685454 B | 2/2020 |
| WO | 2004/088490 A2 | 10/2004 |

\* cited by examiner

ELECTRONIC DEVICE INCLUDING ROLLER

CROSS-REFERENCE TO RELATED APPLICATION(S)

This application is a continuation application, claiming priority under § 365(c), of an International application No. PCT/KR2021/016538, filed on Nov. 12, 2021, which is based on and claims the benefit of a Korean patent application number 10-2020-0150665, filed on Nov. 12, 2020, in the Korean Intellectual Property Office, the disclosures of which is incorporated by reference herein in its entirety.

TECHNICAL FIELD

Certain embodiments of the disclosure relate to an electronic device including a roller.

BACKGROUND ART

With the development of information and communication technology and semiconductor technology, a diversity of computing functions have been integrated into portable electronic devices. For example, portable electronic devices may execute core communication functions, and in addition, may also implement entertainment functions, such as playing games, multimedia functions, such as playing or recording music and videos, communication and security functions (e.g., for mobile banking), and calendar scheduling, and electronic payment functions (e.g., e-wallet operations). These electronic devices are now compact enough for users to carry conveniently.

As mobile communication services extend into multimedia service sectors, electronic devices have evolved to include larger displays. However, the increase in display size often results in larger devices, which degrades portability.

DISCLOSURE

Technical Problem

An electronic device (e.g., a laptop computer) may include a display with a flat surface, a curved surface, or both a flat and curved surface. Accordingly, there is a limitation in realizing a screen larger than the size of the electronic device, due to the fixed display structure. Accordingly, one solution may be found to this issue in electronic devices equipped with foldable or rollable displays.

Because the conventional electronic devices including rollable displays are provided in a scrolled shape, it may be difficult to implement a keyboard (e.g., as commonly integrated in a laptop). Furthermore, the omission of a keyboard reduces the utility of such a device. Accordingly, electronic devices including a foldable displays may encounter limitations in compactness of design.

According to certain embodiments of the disclosure, there is provided an electronic device including a display that may be wound around a roller in two layers.

According to certain embodiments of the disclosure, the electronic device may provide a display that is at least partly usable as a keyboard, by extending in different directions.

The disclosure is not limited to the foregoing embodiments but various modifications or changes may rather be made thereto without departing from the disclosure.

Technical Solution

According to certain embodiments of the disclosure, an electronic device may include a housing, a roller disposed in the housing, a first cover part configured to be detachable from the housing, a second cover part configured to be detachable from the housing, and a display including a first display area including a first end coupled with the first cover part, and a second display area including a second end coupled with the second cover part, wherein at least a portion of the first display area is configured to be wound around the roller while facing at least a portion of the second display area.

According to various embodiments of the disclosure, an electronic device may comprise a housing, a roller disposed in the housing, a first cover part configured to be detachable from the housing in a first direction, a second cover part configured to be detachable from the housing in a second direction different from the first direction, and a display including a first display area including a first end coupled with the first cover part and a second display area including a second end coupled with the second cover part and configured to be wound around the roller.

Advantageous Effects

According to certain embodiments of the disclosure, the electronic device may implement a display extendable in two directions using a display wound in two layers around a roller. As the display extends in different directions, a first portion of the display may be used as a keyboard, and a second portion may be used as a display. As a result, the user's convenience may be increased.

According to certain embodiments of the disclosure, the electronic device may stabilize unfolding/extension of a rollable display stays at a predetermined angle or the user's desired angle, using a hinge structure configured to adjust the extension direction of the rollable display.

According to certain embodiments of the disclosure, the electronic device may stabilize and maintain extension/unfolding of the display using a stopper structure capable of adjusting the rotation of the roller.

MODE FOR INVENTION

Figure 1:
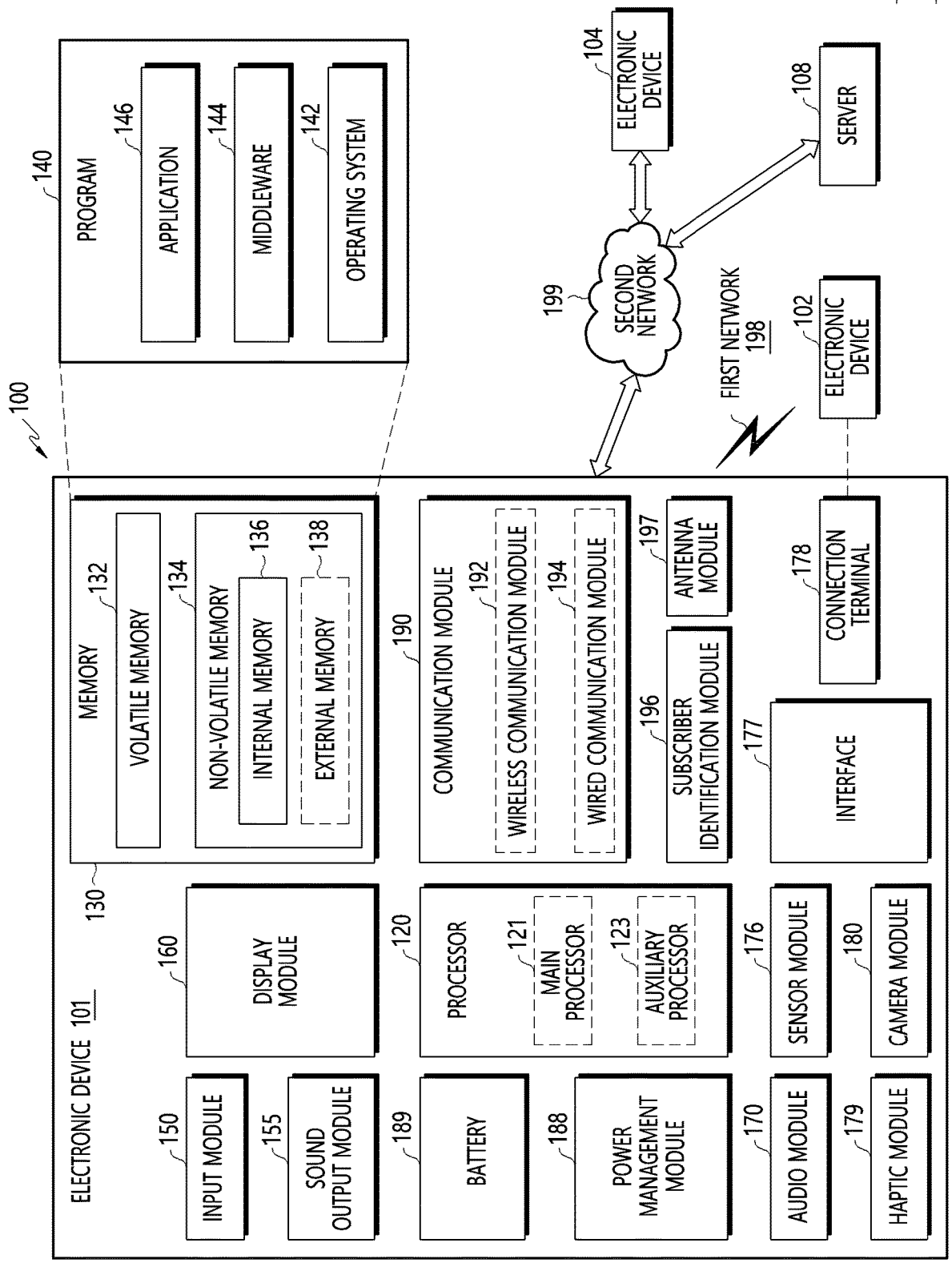
FIG. 1 is a block diagram illustrating an electronic device in a network environment according to certain embodiments of the disclosure.

FIG. 1 is a block diagram illustrating an electronic device in a network environment according to certain embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
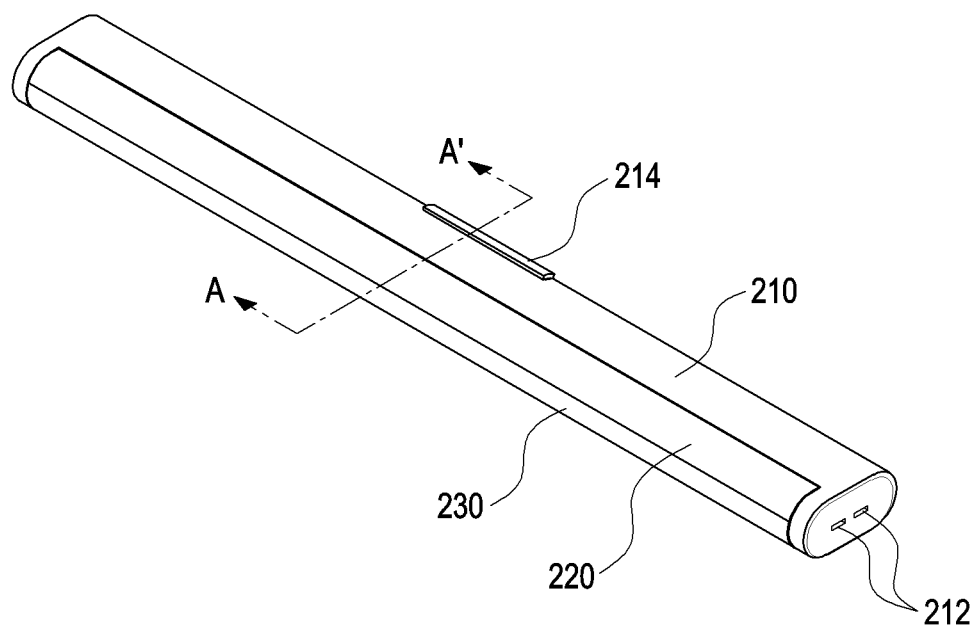
FIG. 2 is a view illustrating an electronic device in a state in which a display is received in a housing, according to certain embodiments of the disclosure.
Figure 3:
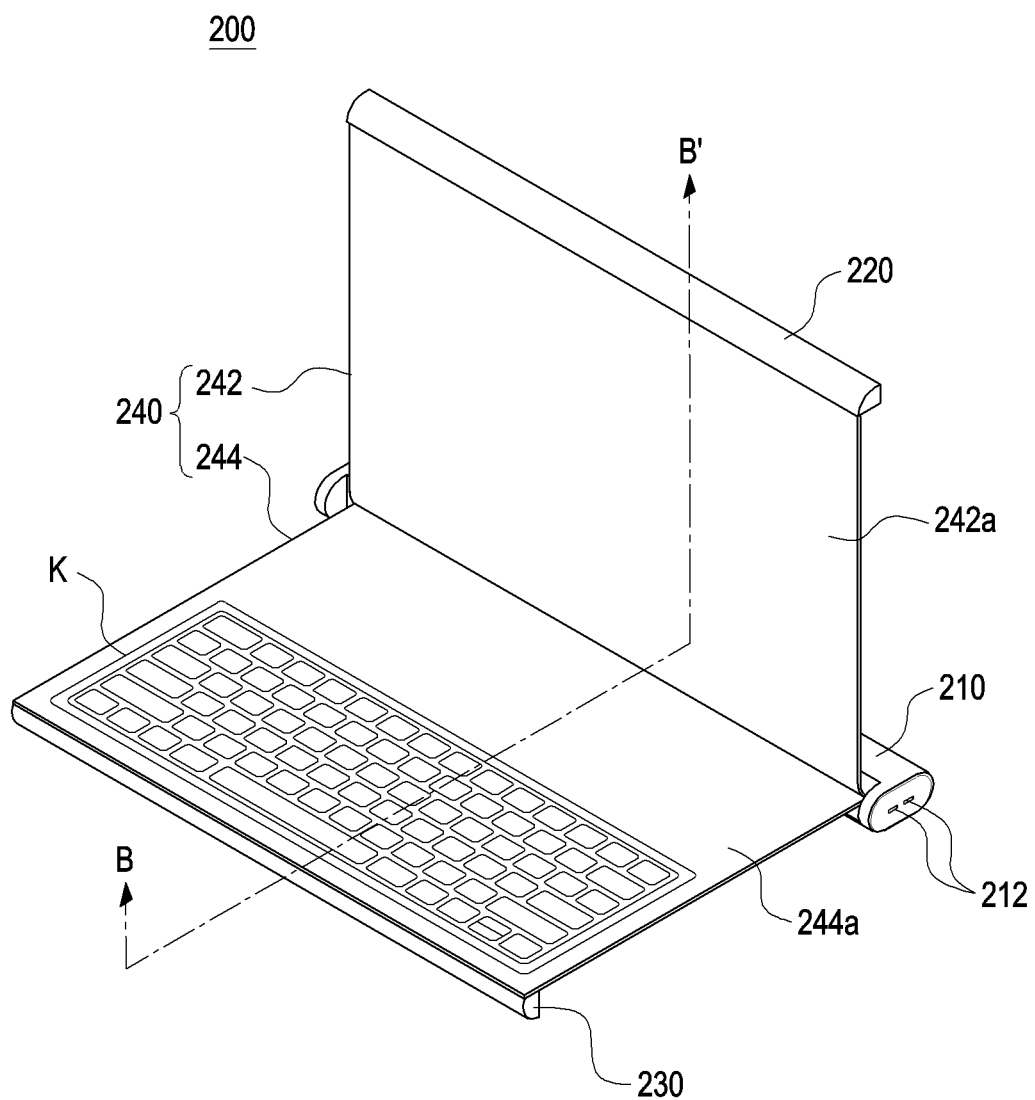
FIG. 3 is a view illustrating an electronic device in a state in which a portion of a display is visually exposed to the outside of a housing, according to certain embodiments of the disclosure.

FIG. 2 is a view illustrating an electronic device in a state in which a display is received in a housing, according to certain embodiments of the disclosure. FIG. 3 is a view illustrating an electronic device in a state in which a portion of a display is visually exposed to the outside of a housing, according to certain embodiments of the disclosure.

According to certain embodiments, the electronic device 200 may be a laptop computer, a notebook computer, or a portable terminal.

Referring to FIGS. 2 and 3, the electronic device 200 may include a housing 210, a display 240, a first cover part 220, and a second cover part 230. The configuration of the electronic device 200 of FIGS. 2 and 3 may be identical in whole or part to the configuration of the electronic device 101 of FIG. 1.

According to certain embodiments, the housing 210 may form at least a portion of the exterior of the electronic device 200. According to an embodiment, the housing 210 may receive at least some of the components (e.g., the roller 250 of FIG. 4) of the electronic device 200. According to an embodiment, the housing 210 may be formed of a metallic material or a non-metallic material having a predesignated magnitude of rigidity.

According to certain embodiments, the electronic device 200 may include at least one connection terminal 212 formed on an outer surface of the housing 210. According to an embodiment, the connecting terminal 212 may receive power from an external electronic device (e.g., the electronic device 102 of FIG. 1) and may transfer the received power to the battery (e.g., the electronic component 202 in FIG. 6) of the electronic device 200. According to an embodiment, the configuration of the connecting terminal 212 of FIG. 3 may be identical in whole or part to the configuration of the connecting terminal 178 of FIG. 1.

According to certain embodiments, the first cover part 220 and/or the second cover part 230 may form a portion of the exterior of the electronic device 200.

According to certain embodiments, the first cover part 220 and/or the second cover part 230 may be configured to be detachable from the housing 210. For example, in a state (e.g., FIG. 2) in which the display 240 is received in the housing 210, the first cover part 220 and/or the second cover part 230 may be positioned adjacent to or in contact with the housing 210 and, in a state (e.g., FIG. 3) in which a portion of the display 240 is visually exposed to the outside of the housing 210, the first cover part 220 and/or the second cover part 230 may be spaced apart from the housing 210. According to an embodiment, the first cover part 220 and/or the second cover part 230 may be distanced from the housing 210 by receiving an external force from the user moving the same away from the housing 210, and subsequently, at least a portion of the display 240 connected with the first cover part 220 and the second cover part 230 may be extended to an exterior of the housing 210.

According to certain embodiments, the electronic device 200 may include an input structure 214 for changing the state of the electronic device 200. According to an embodiment, at least a portion of the input structure 214 may be extended out of the housing 210. According to an embodiment, the input structure 214 may be moved based on a user input. For example, if pressure is applied to the input structure 214, the input structure 214 may transfer at least a portion of the pressure to a component (e.g., the stopper structure 258 of FIG. 11) for fixing the position of the display 240.

According to certain embodiments, the display 240 may include a flexible display, at least a partial area of which may be transformed into a flat or curved surface. For example, the display 240 may be a foldable or rollable display. The configuration of the display 240 may be identical in whole or in part to the configuration of the display module 160 of FIG. 1.

According to certain embodiments, the display 240 may include a touch detection circuit, a pressure sensor capable of measuring the strength (i.e., a pressure level) of touch contacts, and/or a digitizer configured to detect a magnetic field-type stylus pen.

According to certain embodiments, the display 240 may be extended out of the electronic device 200 based on a movement of at least one of the first cover part 220 or the second cover part 230. For example, if the electronic device 200 is folded (e.g., FIG. 2), the display 240 in a rolled state may be disposed within a space formed by the housing 210. As another example, if the electronic device 200 is unfolded as to be extended (e.g., as in FIG. 3), at least a portion of the display 240 may be physically extended into an external environment of the electronic device 200.

According to certain embodiments, the display 240 may be disposed, in a double-rolled structure, in the electronic device 200. According to an embodiment, the display 240 may include a first display area 242 connected with the first cover part 220 and a second display area 224 connected with the second cover part 230. According to an embodiment, the surfaces 222a and 222b for outputting the screen of the display 240 may face each other when they are rolled and stowed. For example, a first front surface 242a of the first display area 242 and a second front surface 244a of the second display area 244 may face one another when the display is rolled.

According to certain embodiments, the display 240 may output a different screen in each area. For example, the processor (e.g., the processor 120 of FIG. 1) may drive different programs (e.g., the program 140 of FIG. 1) in the first display area 242 and the second display area 244. According to an embodiment, the second display area 244 may output a keyboard-shaped image "K" for guiding reception of the user input. The processor 120 may control the content output from at least one of the first display area 242 or the second display area 244 based on the user input received from the second display area 244. According to an embodiment, the processor 120 may adjust the size of the keyboard-shaped image K based on the length of the second display area 244 that has been extended into an external environment of the electronic device 200. According to another embodiment, the second display area 244 may output the keyboard-shaped image K at a predetermined size.

Figure 4:
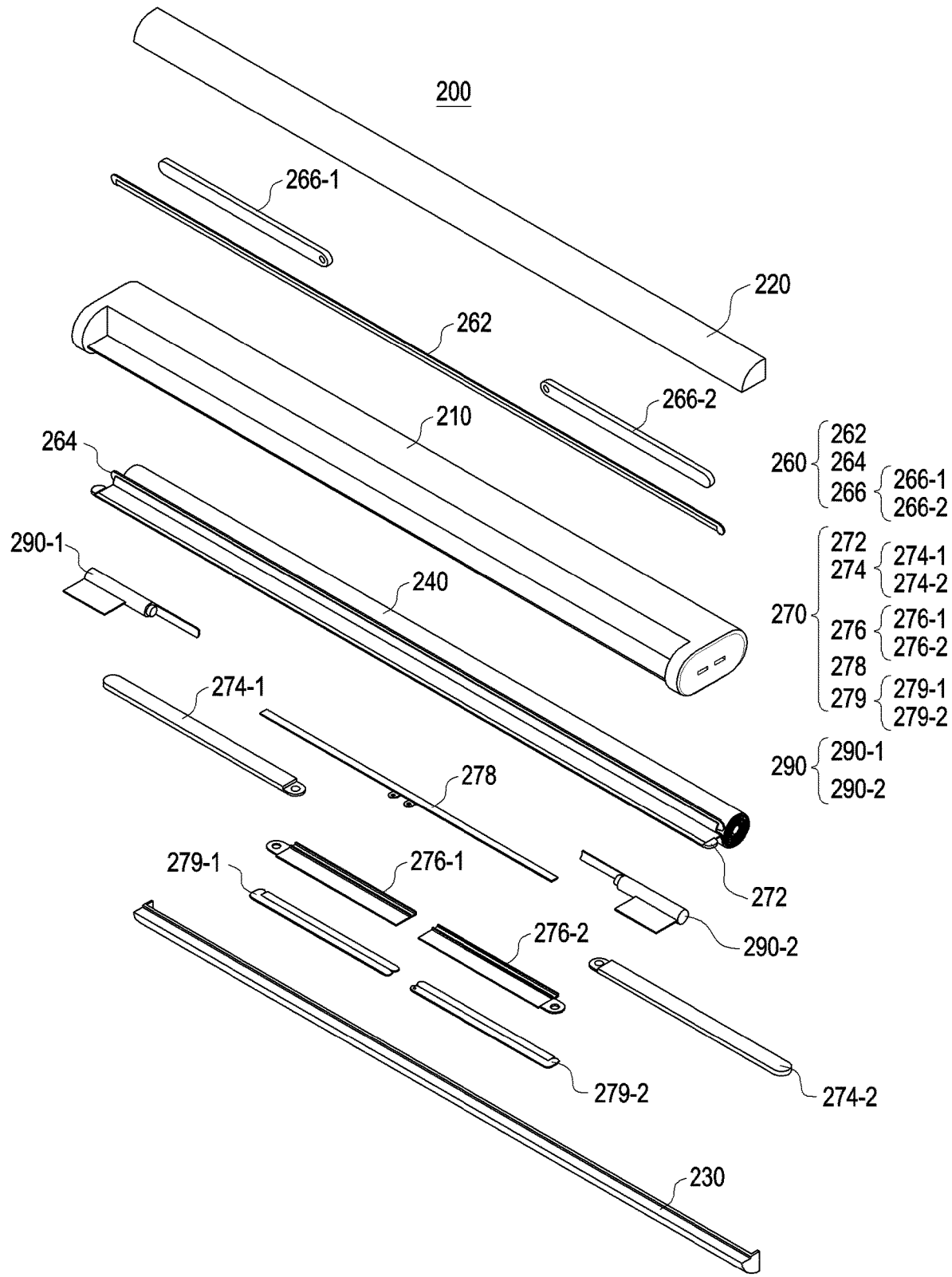
FIGS. 4 and 5 are exploded perspective views illustrating an electronic device according to certain embodiments of the disclosure.
Figure 5:
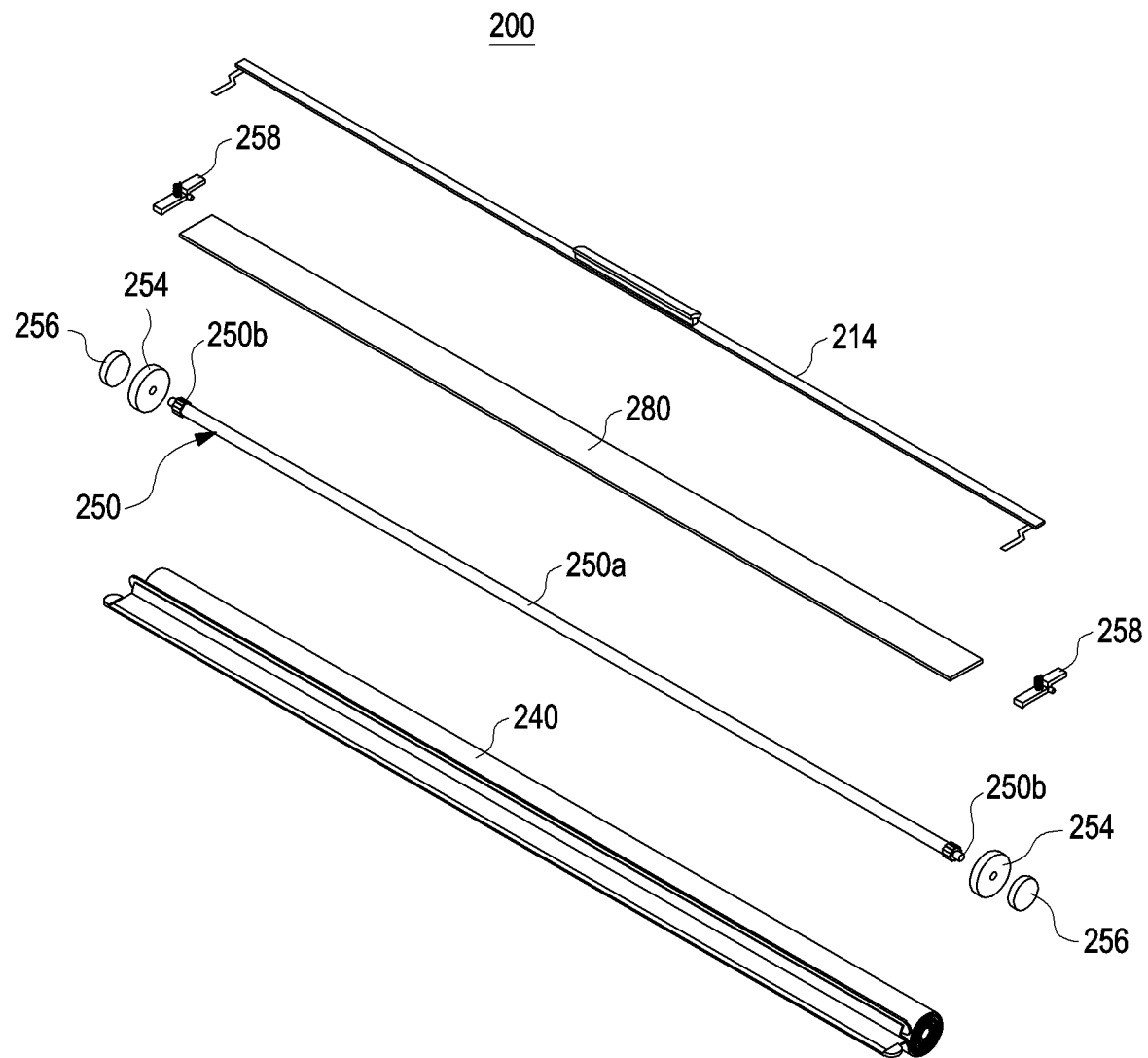

FIGS. 4 and 5 are exploded perspective views illustrating an electronic device according to certain embodiments of the disclosure.

Referring to FIGS. 4 and 5, an electronic device 200 may include a housing 210, a first cover part 220, a second cover part 230, a display 240, a roller 250, a first supporting bracket 260, a second supporting bracket 270, an elastic member 280, a printed circuit board (not shown), and/or a hinge structure 290. The configuration of the housing 210, the first cover part 220, the second cover part 230, and the display 240 of FIGS. 4 and 5 may be identical in whole or part to the configuration of the housing 210, the first cover part 220, the second cover part 230, and the display 240 of FIGS. 2 and 3. For example, the display 240 may be electrically connected with a printed circuit board (not shown) on which an electronic component (e.g., the processor 120 of FIG. 1) is mounted.

According to certain embodiments, the display 240 may be, in some configurations, wound around the roller 250. According to an embodiment, the display 240 may be wound around the roller 250 in two layers. For example, at least a portion of the first display area 242 may be wound around the roller 250 while facing at least a portion of the second display area 244. According to some embodiments, the roller 250 may include a central area 250a having a cylindrical shape. The display 240 may be wound around the central area 250a. The central area 250a may be positioned between a plurality of end areas 250b. According to an embodiment, the central area 250a of the roller 250 may be formed in various shapes. For example, the central area 250a of the roller 250 may be formed in a cylindrical shape, an elliptical column shape, and/or a polygonal (e.g., triangular, rectangular, pentagonal, hexagonal, or heptagonal) column shape.

According to certain embodiments, the roller 250 may be disposed in the housing 210. According to an embodiment, the roller 250 may support at least a portion of the display 240 while at least a portion of the display 240 is received in the housing 210.

According to certain embodiments, the electronic device 200 may include at least one spring structure 254 configured to provide an elastic force to the roller 250. According to an embodiment, the spring structure 254 may provide an elastic force to the roller 250 in a direction in which the display 240 is received in the housing 210 (e.g., via retraction). According to an embodiment, the spring structure 254 may be connected with at least one of the end areas 250b of the roller 250. For example, the spring structure 254 may include a coil spring, a leaf spring, a torsion spring, a compression spring (mainspring), and/or a rubber spring.

According to certain embodiments, the electronic device 200 may include at least one damping member 256 for adjusting a rotational speed of the roller 250. According to an embodiment, the damping member 256 may include oil. Using the viscous resistance of the oil, the damping member 256 may adjust the rotation speed of the roller 250, by the spring structure 254 (e.g., to a value lower than the implicit value resultant from the elastic force). According to an embodiment, the damping member 256 may be connected with at least one of the end areas 250b of the roller 250. As another example, the damping member 256 may include an elastic member (e.g., rubber) and reduce the rotation speed of the roller 250 via contact resistance (e.g., frictional force) of the elastic member.

According to certain embodiments, the electronic device 200 may include a stopper structure 258 for adjusting the rotation of the roller 250. According to an embodiment, the stopper structure 258 may contact a portion (e.g., a protrusion 252 in FIG. 6) of the roller 250, thereby limiting movement in the direction in which the display 240 is received into the housing 210. The display 240 may thus be maintained in an unfolded state by the stopper structure 258, with the display extended to a length either to a mechanically maximum, or to a shorter, custom length set by the user.

According to certain embodiments, the electronic device 200 may include an input structure 214 for controlling the movement of the stopper structure 258. According to an embodiment, a portion of the input structure 214 may be exposed to the external environment of the housing 210, and another portion thereof may be connected to the stopper structure 258. If pressure is applied to the input structure 214 by the user, the stopper structure 258 may be spaced apart from the roller 250, and the display 240 may be retracted into the housing 210. According to an embodiment, the input structure 214 may change the position of the stopper structure 258 with respect to the plurality of protrusions 252 based on the user input.

According to certain embodiments, the first supporting bracket 260 may support a portion of the display 240 (e.g., the first display area 242). For example, in a state in which a portion of the display 240 is extended and thus visible outside of the housing 210, the first supporting bracket 260 may support at least a portion of the rear surface (e.g., the second surface 242b of FIG. 7) of the first display area 242.

According to certain embodiments, the distance between the first cover part 220 and the housing 210 may be changed based on the movement of the first supporting bracket 260. For example, the first supporting bracket 260 may guide sliding of the first cover part 220 relative to the housing 210. For example, the first supporting bracket 260 may include a first supporting member 262 connected with the housing 210, a second supporting member 264 connected to the display 240, and a first bar 266 connected with the first cover part 220 and the first supporting member 262. The first bar 266 may include a plurality of first bars 266-1 and 266-2, and the plurality of first bars 266-1 and 266-2 may be rotated with respect to a point (e.g., the first point 330a of FIG. 14C). The structure of the first supporting bracket 260 is described in further detail below, with reference to FIGS. 14A, 14B and 14C.

According to certain embodiments, the second supporting bracket 270 may support a portion of the display 240 (e.g., the second display area 244). For example, in a state in which a portion of the display 240 is extended and thus visible to the external environment of the housing 210, the second supporting bracket 270 may support at least a portion of the rear surface (e.g., the fourth surface 244b of FIG. 7) of the second display area 244.

According to certain embodiments, the distance between the second cover part 230 and the housing 210 may be changed based on the movement of the second supporting bracket 270. For example, the second supporting bracket 270 may guide the second cover part 230 to slide with respect to the housing 210. According to an embodiment, the second supporting bracket 270 may include a third supporting member 272 connected with the housing 210, a second bar 274 connected with the second cover part 230, a guide member 276 connected with the second bar 274, a fourth supporting member 278 at least partially receivable in the guide member 276, and a third bar 279 connected with the fourth supporting member 278 and the second cover part 230. The second bar 274 may include a plurality of second bars 274-1 and 274-2. The second bar 274 may rotate with respect to a point (e.g., the point 274c of FIG. 7), and the third bar 279 connected with the fourth supporting member 278 may rotate with respect to a point (e.g., the seventh point 450c or the eighth point 450d of FIG. 15C). The guide member 276 may include a plurality of guide members 276-1 and 276-2. The third bar 279 may include a plurality of third bars 279-1 and 279-2. The structure of the second supporting bracket 270 is described in detail with reference to FIGS. 15A, 15B and 15C.

According to certain embodiments, an elastic member 280 may connect the display 240 to the roller 250. For example, the elastic member 280 may include a third end 282 connected with the display 240, and a fourth end 284 positioned opposite the third end 282 and connected with the roller 250. According to an embodiment, the elastic member 280 may include a fiber or leaf spring. According to an embodiment, the elastic member 280 may be formed in various shapes. For example, in FIG. 5, the elastic member 280 is depicted in the example shape of a flat plate, but other embodiments are contemplated in the disclosure. Furthermore, the elastic member 280 may include a plurality of elastic members (not shown).

According to certain embodiments, the hinge structure 290 may rotatably connect the second supporting bracket 270 to the housing 210. For example, the hinge structure 290 may be disposed on the housing 210, and may support the plurality of second bars 274 of the second supporting bracket 270. According to an embodiment, the hinge structure 290 may include a detent structure (not shown) that provides a frictional force capable of maintaining a constant angle when supporting the load of the display 240 and/or the second supporting bracket 270. According to an embodiment, there may be provided a plurality of hinge structures 290. For example, the hinge structure 290 may include a plurality of hinge structures 290-1 and 290-2.

Figure 6:
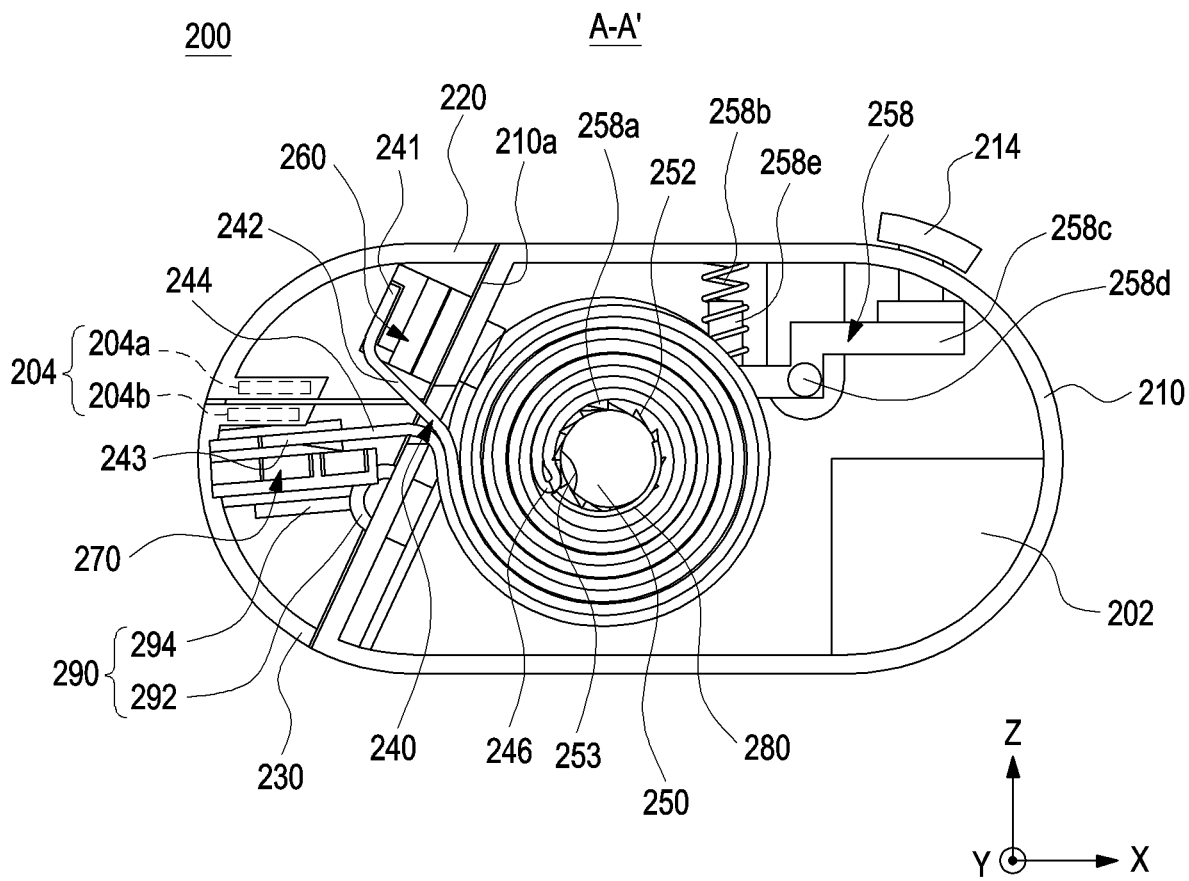
FIG. 6 is a cross-sectional view taken along line A-A' of FIG. 2.
Figure 7:
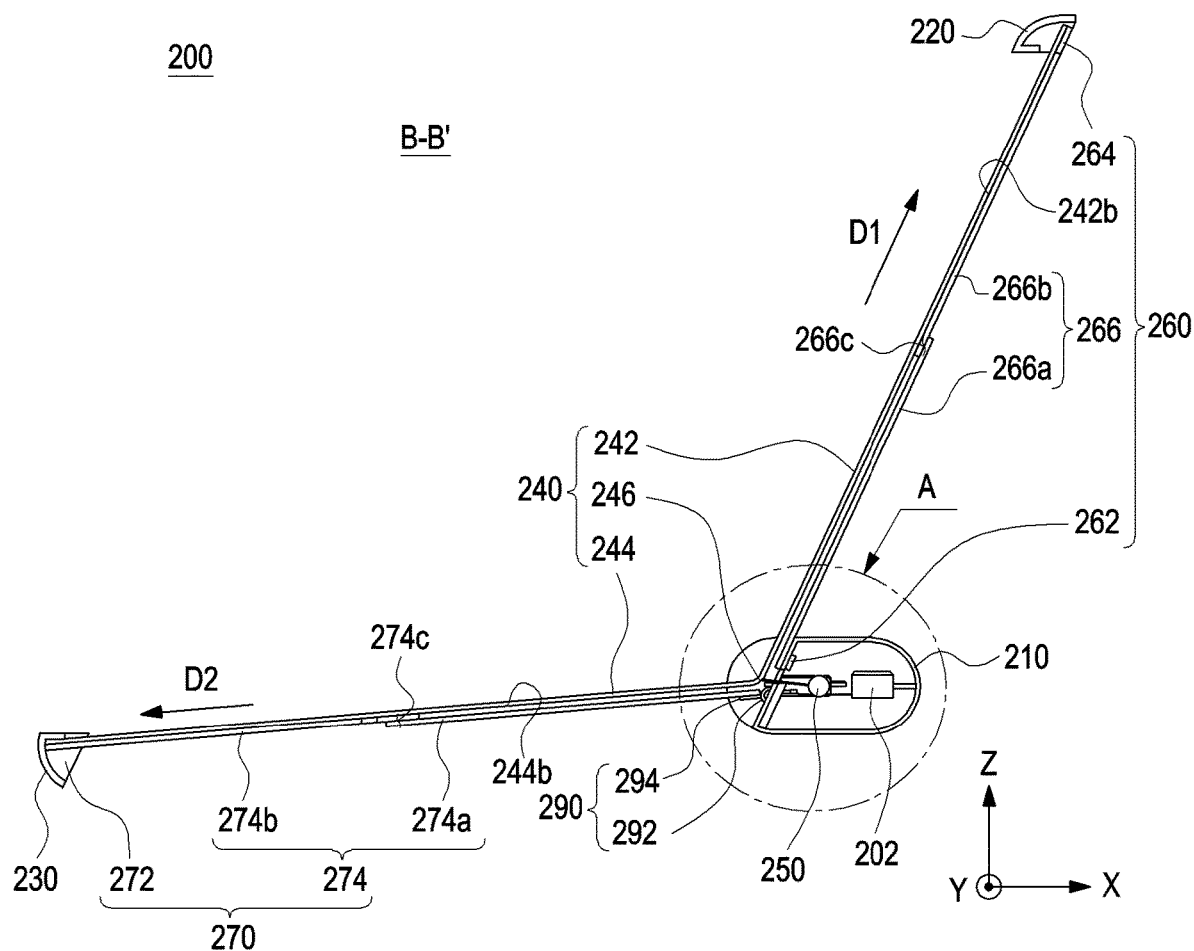
FIG. 7 is a cross-sectional view taken along line B-B' of FIG. 3.
Figure 8:
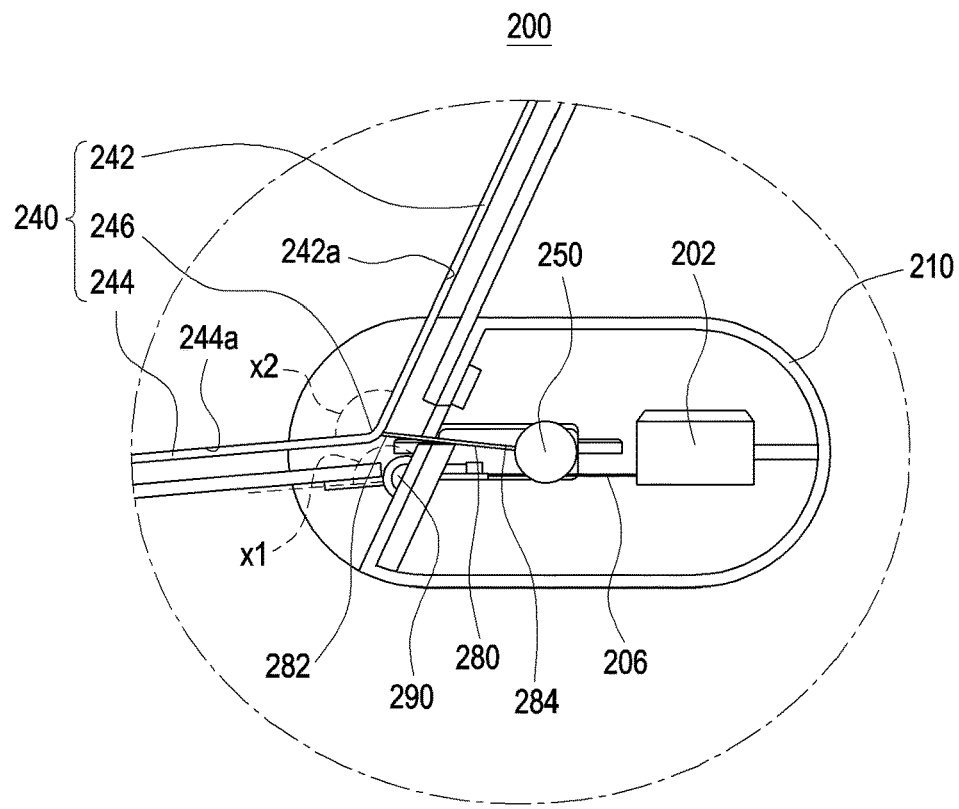
FIG. 8 is an enlarged view of area A of FIG. 7.
Figure 9:
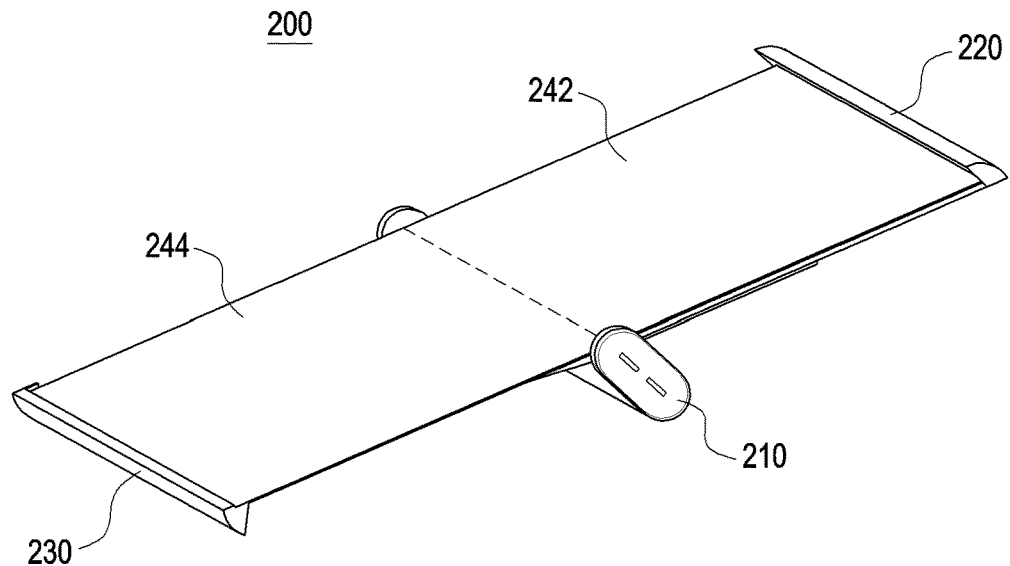
FIG. 9 is a view illustrating an angle between a first display area and a second display area according to certain embodiments of the disclosure.

FIG. 6 is a cross-sectional view taken along line A-A' of FIG. 2. FIG. 7 is a cross-sectional view taken along line B-B' of FIG. 3. FIG. 8 is an enlarged view of area A of FIG. 7. FIG. 9 is a view illustrating an angle between a first display area and a second display area according to certain embodiments of the disclosure. The configuration of the housing 210, the input structure 214, the first cover part 220, the second cover part 230, the display 240, the roller 250, the first supporting bracket 260, the second supporting bracket 270, and/or the elastic member 280 of FIGS. 6 to 9 may be identical in whole or part to the configuration of the housing 210, the input structure 214, the first cover part 220, the second cover part 230, the display 240, the roller 250, the first supporting bracket 260, the second supporting bracket 270, and/or the elastic member 280 of FIGS. 4 and 5.

According to certain embodiments, the electronic device 200 may include an electronic component 202. According to an embodiment, the electronic component 202 may include at least one of a battery (e.g., the battery 189 of FIG. 1) or a printed circuit board (not shown) on which a processor (e.g., the processor 120 of FIG. 1) is disposed. According to an embodiment, the electronic component 202 may be electrically connected with the display 240 using a flexible printed circuit board 206.

According to certain embodiments, the electronic device 200 may include at least one antenna module (e.g., the antenna module 197 of FIG. 1). According to an embodiment, the electronic device 200 may include at least one antenna module 197 disposed in the housing 210 of FIGS. 6 to 8. According to an embodiment, at least a portion of the housing 210, as an antenna radiator, may be electrically connected with a printed circuit board (not shown).

According to certain embodiments, the electronic device 200 may include at least one magnet 204. According to an embodiment, the magnet 204 may include a first magnet 204a disposed in the first cover part 220 and a second magnet 204b disposed in the second cover part 230 and facing the first magnet 204a. According to an embodiment, the first cover part 220 and the second cover part 230 may be coupled using the magnet 204. For example, the polarity of the first magnet 204a and the polarity of the second magnet 204b may be different.

According to certain embodiments, at least a portion of the housing 210 may face the first cover part 220 and the second cover part 230. For example, the housing 210 may include a first surface 210a configured to face the first cover part 220 and the second cover part 230. According to an embodiment, at least a portion of the first supporting bracket 260 and at least a portion of the second supporting bracket 270 may be disposed on the first surface 210a of the housing 210.

According to certain embodiments, the display 240 may be coupled with the first cover part 220 and the second cover part 230. For example, the display 240 may include a first display area 242 including a first end 241 coupled with the first cover part 220 and a second display area 244 including a second end 243 coupled with the second cover part 230. The first end 241 may be coupled with the first cover part 220 through the first supporting bracket 260, and the second end 243 may be coupled with the second cover part 230 through the second supporting bracket 270.

According to certain embodiments, the display 240 may include a third display area 246 positioned between the first display area 242 and the second display area 244. According to an embodiment, the third display area 246 may be defined as an area in which the display 240 is folded. According to an embodiment, the curvature of the display 240 may be limited to a predetermined curvature. For example, in a state (e.g., FIG. 6) in which the display 240 is received in the housing 210, the first front surface 242a of the first display area 242 and the second front surface 244a of the second display area 244 may be rolled around the roller 250 while facing each other, and the third display area 246 may be rolled around the roller 250 while being spaced apart.

According to certain embodiments, the roller 250 may include a plurality of protrusions 252. According to an embodiment, the plurality of protrusions 252 may protrude from an end (e.g., the end area 250b of FIG. 5) of the roller 250. According to an embodiment, the plurality of protrusions 252 may contact the stopper structure 258.

According to certain embodiments, the roller 250 may include a display receiving groove 253. According to an embodiment, the display receiving groove 253 may receive at least a portion (e.g., the third display area 246) of the display 240. According to an embodiment, the display receiving groove 253 may be a groove formed along the length direction (e.g., the Y-axis direction) of the roller 250.

According to certain embodiments, the stopper structure 258 may include a stopper portion 258a for contacting the plurality of protrusions 252, a spring portion 258b connected with the housing 210, a body portion 258c connected with the spring portion 258b and the input structure 214, a rotation portion 258d disposed within an opening 214a of the input structure 214, and an end 258e projecting from the body portion 258c toward the housing 210. According to an embodiment, the display 240 and the end 258e of the body portion 258c may be spaced apart from the housing 210.

According to certain embodiments, a movement of the display 240 may be controlled in part based on the stopper structure 258. According to an embodiment, when the protrusion 252 is spaced apart from the stopper portion 258a, the roller 250 may be rotatable, and the display 240 is movable. If the pressure applied to the input structure 214 is reduced as compared with the elastic force of the spring portion 258b, the spring portion 258b may move downward (e.g., in the −Z direction), and the stopper portion 258a may contact the protrusion 252 of the roller 250. According to an embodiment, with the protrusion 252 contacting the stopper portion 258a, the movement of the roller 250, the first cover part 220, and the second cover part 230 may be substantially limited. The movement of the display 240 based on the stopper structure 258 is described in detail with reference to FIGS. 10 and 11.

According to certain embodiments, the first supporting bracket 260 may be detachable in a first direction D1 with respect to the housing 210. For example, the first supporting bracket 260 may include a first supporting member 262 connected with the housing 210, a second supporting member 264 connected with the first cover part 220, and a plurality of first bars 266 positioned between the first supporting member 262 and the second supporting member 264. According to an embodiment, the plurality of first bars 266 may slide the first cover part 220 in the first direction D1. For example, the plurality of first bars 266 may include a 1-1th bar 266a connected with the housing 210 and/or the first supporting member 262 and a 1-2th bar 266a connected with the second supporting member 264. The 1-1th bar 266a and the 1-2th bar 266*b* may rotate with respect to a point 266*c* (e.g., the first point 330*a* and/or the second point 330*b* of FIG. 14C).

According to certain embodiments, the second supporting bracket 270 may be detachable in a second direction D2 with respect to the housing 210. For example, the second supporting bracket 270 may include a third supporting member 272 connected with the second cover part 230, and a plurality of second bars 274 connected with the housing 210 through a hinge structure 290. According to an embodiment, the plurality of second bars 274 may slide the second cover part 230 in the second direction D2. For example, the plurality of second bars 274 may include a 2-1th bar 274*a* connected with the housing 210 and/or the hinge structure 290 and a 2-2th bar 274*b* connected with the third supporting member 272. The 2-1th bar 274*a* and the 2-2th bar 274*b* may rotate with respect to a point 274*c* (e.g., the third point 420*c* and/or the fourth point 420*d* of FIG. 15C). According to an embodiment, the second direction D2 may be different from the first direction D1 in which the first supporting bracket 260 moves with respect to the housing 210.

According to certain embodiments, the elastic member 280 may be connected with the third display area 246. For example, the elastic member 280 may include a third end 282 connected with the third display area 246 and a fourth end 284 connected with the roller 250.

According to certain embodiments, the hinge structure 290 may be disposed on the housing 210 and may support the second supporting bracket 270. For example, the hinge structure 290 may include a fixing part 292 disposed on the first surface 210*a* of the housing 210, and a rotation bracket 294 rotating with respect to the fixing part 292 and supporting the second supporting bracket 270.

According to certain embodiments, the angle between the first display area 242 and the second display area 244 may be varied. For example, the rotation bracket 294 may rotate at various angles with respect to the first surface 210*a* of the housing 210. For example, a first angle x1 between the rotation bracket 294 and the first surface 210*a* may be formed between 0 degrees and 180 degrees. According to an embodiment, the display 240 may be bent based on the hinge structure 290. The second supporting bracket 270 connected with the rotation bracket 294, and the second display area 244 connected with the rotation bracket 294 through the second supporting bracket 270 may be rotatable with respect to the first surface 210*a*. For example, a second angle x2 between the first display area 242 and the second display area 244 may be substantially equal to the first angle x1. According to an embodiment (e.g., FIG. 9), the first display area 242 and the second display area 244 may be positioned on substantially matching planes. For example, the first display area 242 and the second display area 244 may be implemented seamlessly.

Figure 10:
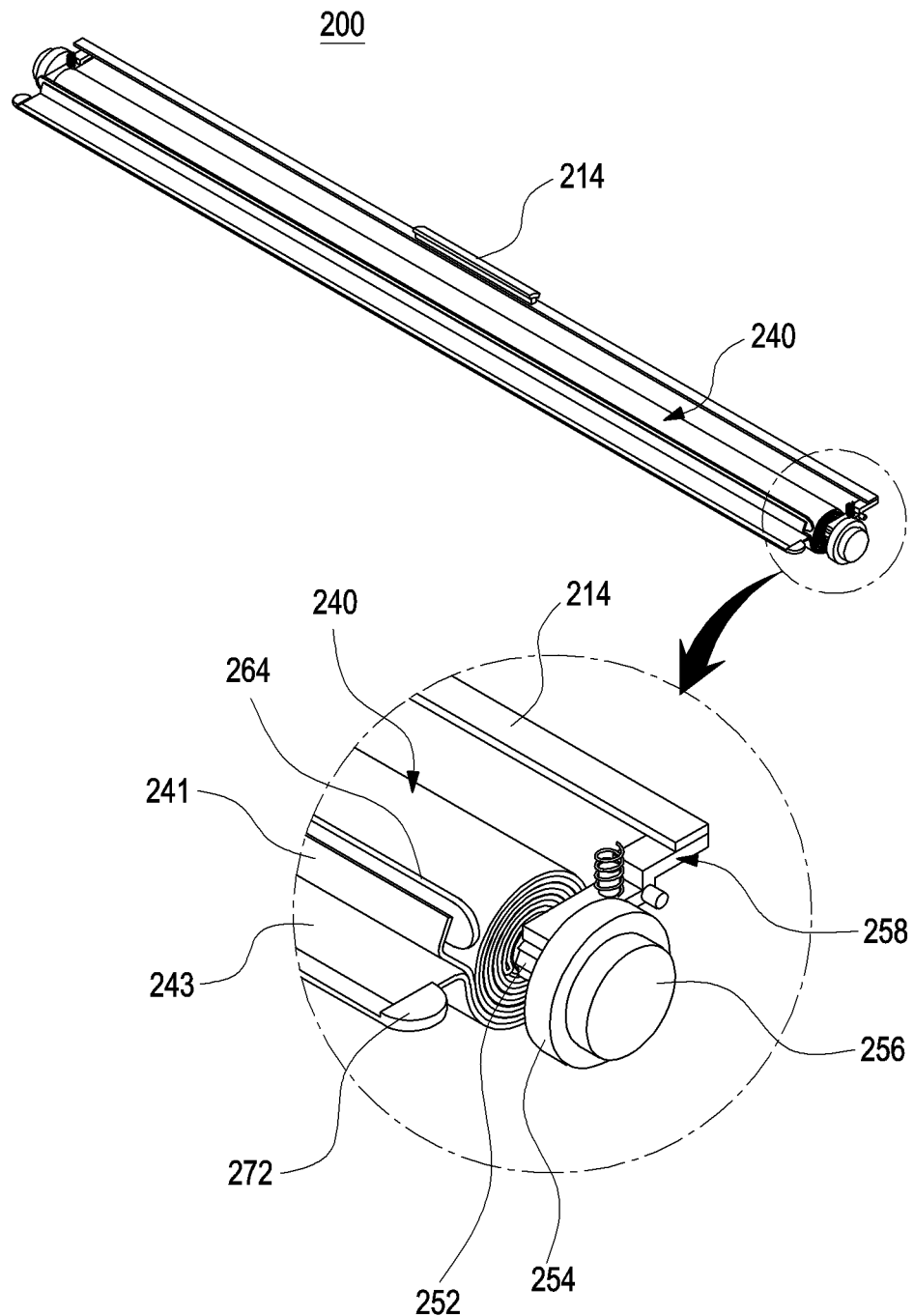
FIG. 10 is a perspective view illustrating a display wound around a roller according to certain embodiments of the disclosure.
Figure 11:
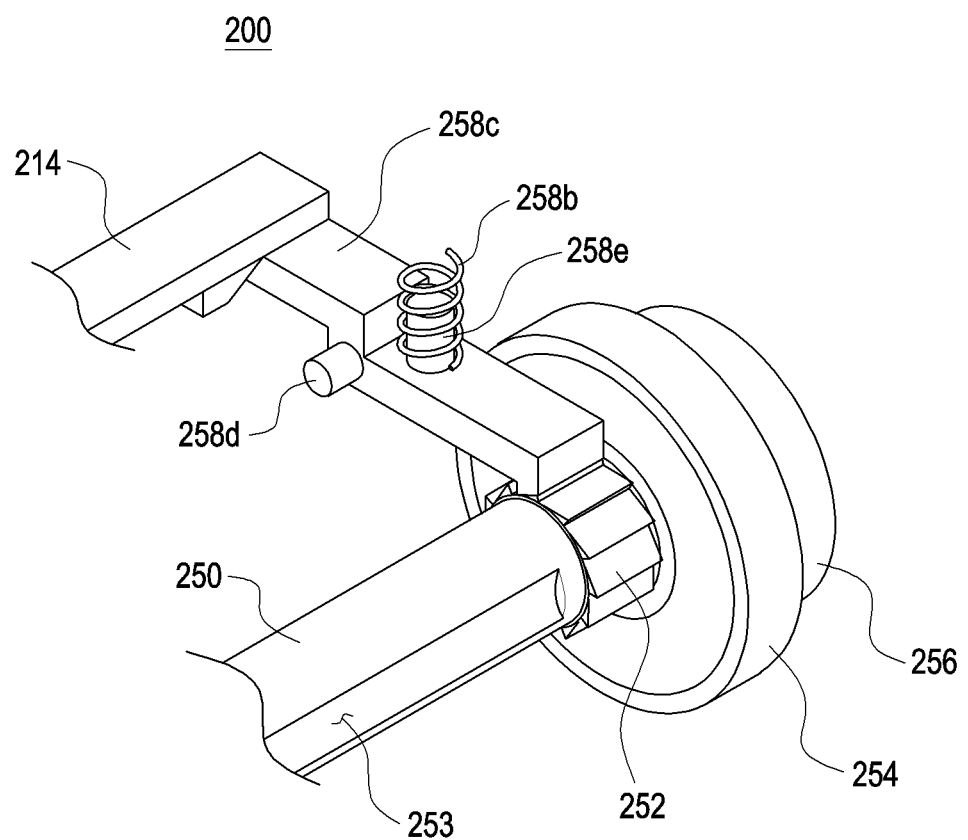
FIG. 11 is a perspective view illustrating a roller except for a display according to certain embodiments of the disclosure.

FIG. 10 is a perspective view illustrating a display wound around a roller according to certain embodiments of the disclosure. FIG. 11 is a perspective view illustrating a roller except for a display according to certain embodiments of the disclosure.

Referring to FIGS. 10 and 11, the electronic device 200 may control the movement of the roller 250 using the stopper structure 258. The configuration of the input structure 214, the display 240, the roller 250, the spring structure 254, the damping member 256, and the stopper structure 258 of FIGS. 10 and 11 may be identical in whole or part to the configuration of the input structure 214, the display 240, the roller 250, the spring structure 254, the damping member 256, and the stopper structure 258 of FIG. 6, and so, duplicative descriptions thereof will be omitted.

According to certain embodiments, at least a portion of the stopper structure 258 may rotate around the rotation portion 258*d*. According to an embodiment, if a pressure greater than the elastic force of the spring portion 258*b* is applied to the input structure 214, the stopper structure 258 may rotate around the rotation portion 258*d* in a third direction D3, in which the spring portion 258*b* is compressed. For example, a portion of the body portion 258*c* disposed under the input structure 214 (e.g., the −Z direction) may move downward (e.g., the −Z direction), and the end 258*e* of the body portion 258*c* adjacent to the spring portion 258*b* may move upward (e.g., the +Z direction).

According to certain embodiments, if a pressure greater than the elastic force of the spring portion 258*b* is applied to the input structure 214, the stopper portion 258*a* may be spaced apart from the protrusion 252 of the roller 250, and the roller 250 may be rotatable. As the roller 250 rotates, at least a portion of the display 240 may be extended as to exit the housing 210 to an external environment. For example, if the user pulls the first cover part (e.g., the first cover part 220 of FIG. 6) and/or the second cover part (e.g., the second cover part 230 of FIG. 6), the first end 241 connected with the second supporting member 264 of the first cover part 220 and the second end 243 connected with the third supporting member 272 of the second cover part 230 may be moved in the direction spaced apart from the roller 250.

According to certain embodiments, if a pressure greater than the elastic force of the spring portion 258*b* is not applied to the input structure 214, the display 240 and/or the roller 250 may be substantially fixed. For example, the stopper portion 258*a* in contact with the protrusion 252 of the roller 250 may restrict rotation of the roller 250, and the display 240 connected with the roller 250 will not rotate.

According to certain embodiments, if the pressure applied to the input structure 214 is smaller than the elastic force of the spring portion 258*b*, the spring portion 258*b* may move downward (e.g., in the −Z direction), and the stopper portion 258*a* may contact the protrusion 252 of the roller 250. According to an embodiment, with the protrusion 252 contacting the stopper portion 258*a*, the movement of the roller 250, the first cover part 220, and the second cover part 230 may be substantially limited.

Figure 12:
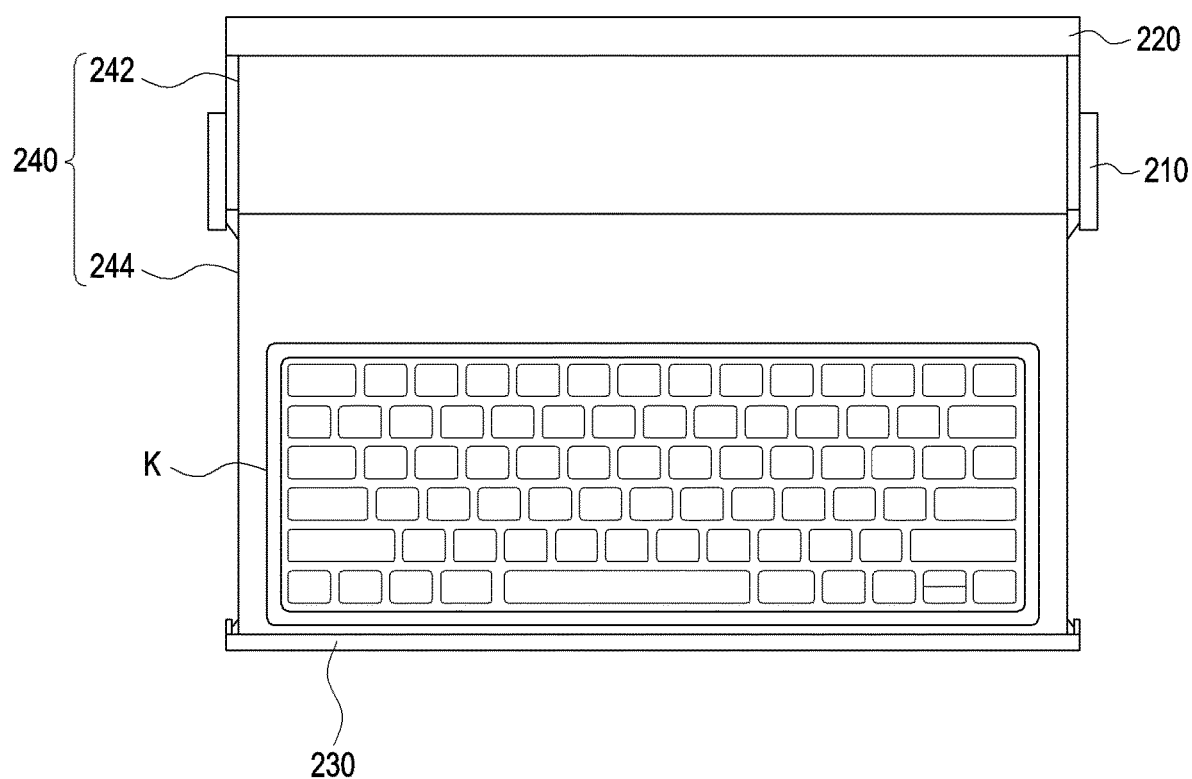
FIG. 12 is a front view illustrating an electronic device in an unfolded state, according to certain embodiments of the disclosure.
Figure 13:
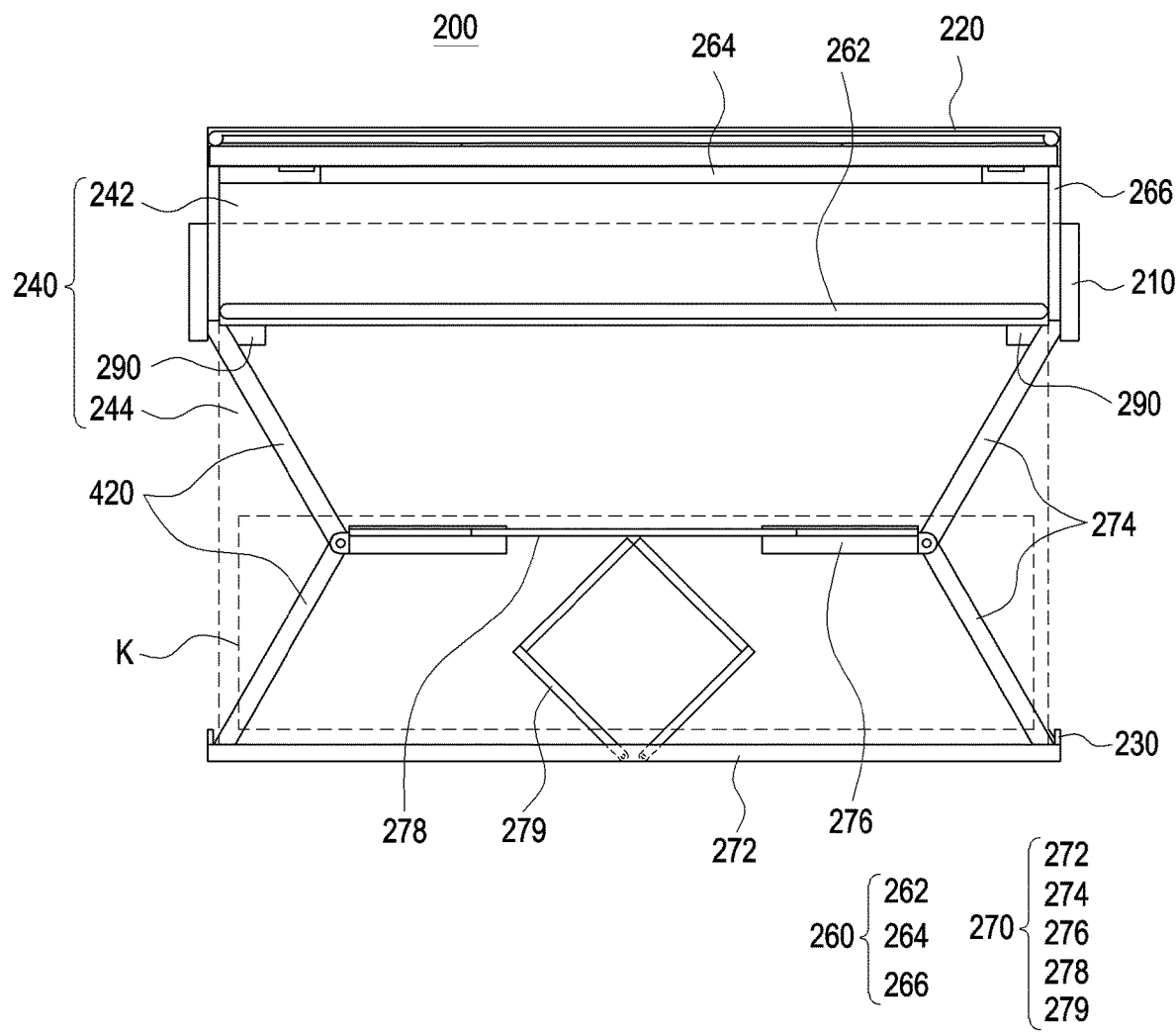
FIG. 13 is a see-through view of the electronic device of FIG. 12.

FIG. 12 is a front view illustrating an electronic device in an unfolded state, according to certain embodiments of the disclosure. FIG. 13 is a see-through view of the electronic device of FIG. 12.

Referring to FIGS. 12 and 13, the electronic device 200 may include a first supporting bracket 260 supporting the first display area 242 of the display 240 and a second supporting bracket 270 supporting the second display area 244 of the display 240. Referring to FIGS. 12 and 13, the configuration of the housing 210, the first cover part 220, the second cover part 230, the display 240, the first supporting bracket 260, the second supporting bracket 270, and the hinge structure 290 may be identical in whole or part to the configuration of the housing 210, the first cover part 220, the second cover part 230, the display 240, the first supporting bracket 260, the second supporting bracket 270, and the hinge structure 290 of FIGS. 6 to 9.

According to certain embodiments, the first supporting bracket 260 may be connected with the housing 210 and the first cover part 220. For example, the first supporting bracket 260 may include a first supporting member 262 connected with the first cover part 220, a second supporting member 264 connected with the housing 210, and a plurality of first bars 266 disposed between the first supporting member 262 and the second supporting member 264. According to an embodiment, the plurality of first bars 266 may rotate based on the distance between the first supporting member 262 and the second supporting member 264. For example, the first bar 266 may be connected with the end of the first supporting member 262 or the end of the second supporting member 264 and may rotate about the end of the first supporting member 262 or the end of the second supporting member 264.

According to certain embodiments, the second supporting bracket 270 may be connected with the housing 210 and the second cover part 230. For example, the second supporting bracket 270 may include a third supporting member 272 connected with the second cover part 230, a plurality of second bars connected with the hinge structure 290 disposed on the housing 210, a guide member 276 connected with the second bar 274, a fourth supporting member 278 at least partially received in the guide member 276, and a third bar connected with the third supporting member 272 and the fourth supporting member 278. According to an embodiment, at least a portion of the second supporting bracket 270 may support the portion of the display 240 that displays a keyboard-shaped image K. For example, the fourth supporting member 278 and the third bar 279 may be positioned under the display 240, in a position corresponding to the keyboard-shaped image K of the second display area 244.

Figure 14A:
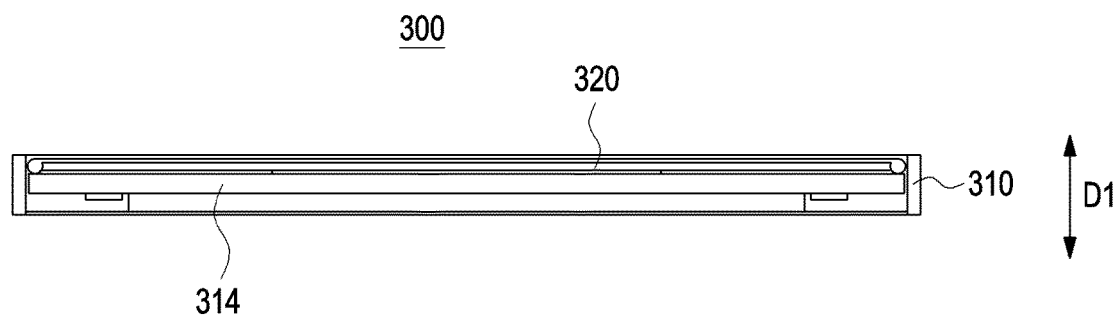
FIGS. 14A, 14B, and 14C are views illustrating a first supporting bracket according to certain embodiments of the disclosure.
Figure 14B:
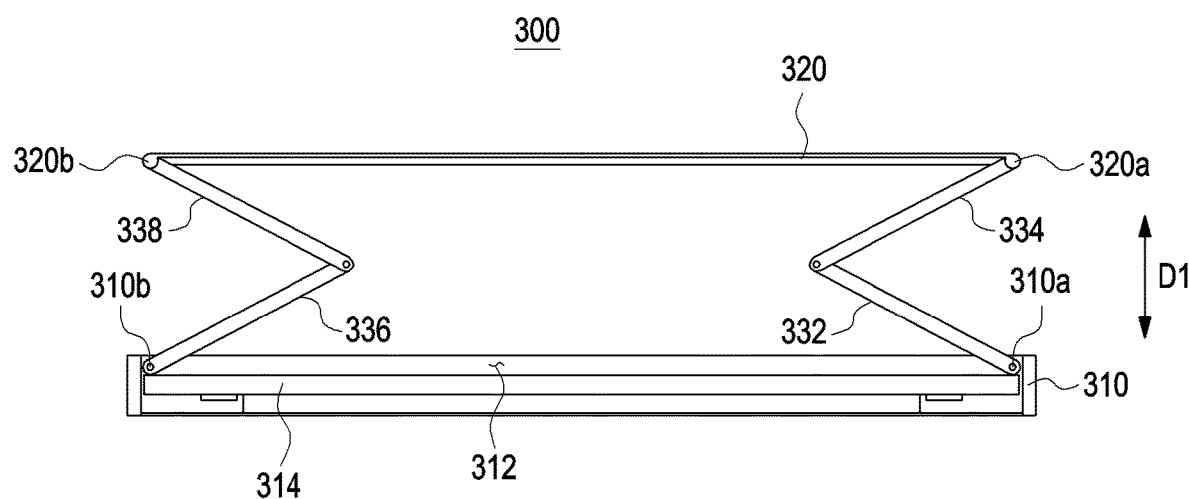
Figure 14C:
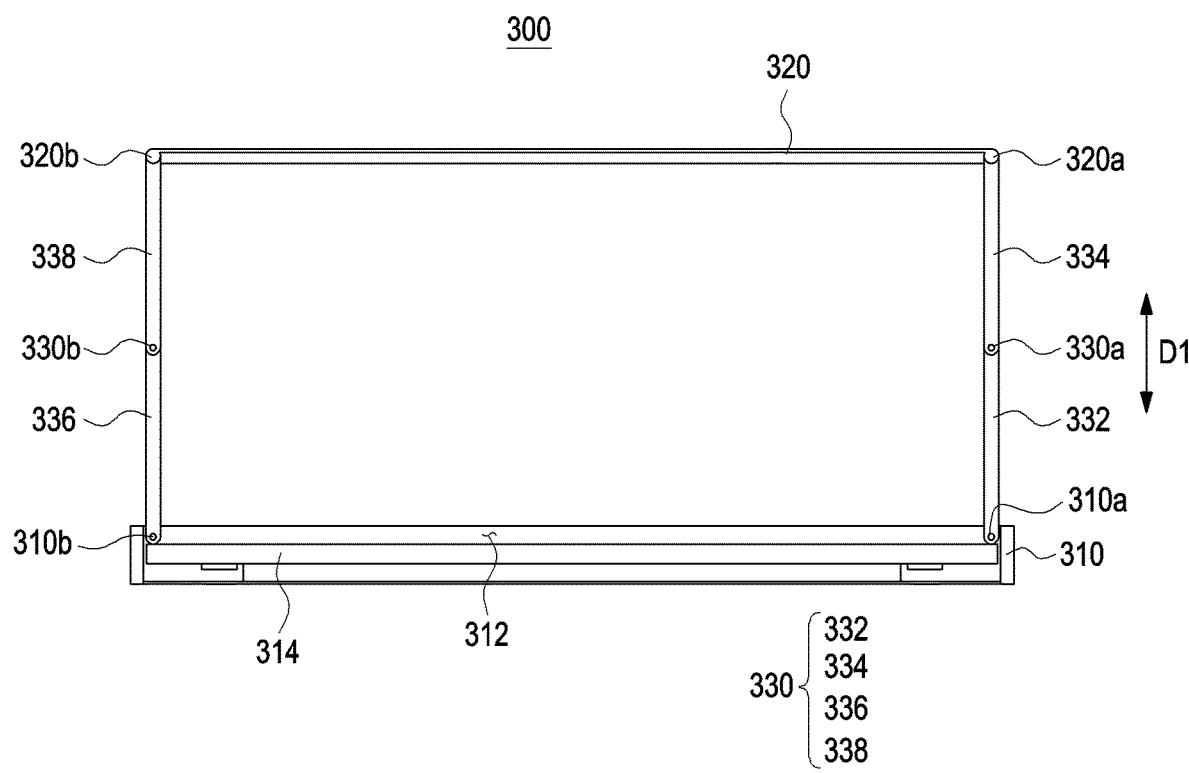

FIGS. 14A, 14B, and 14C are views illustrating a first supporting bracket according to certain embodiments of the disclosure.

Referring to FIGS. 14A, 14B, and 14C, the first supporting bracket 300 may include a first supporting member 310 connected with a housing (e.g., the housing 210 of FIG. 13), a second supporting member 320 connected with a first cover part (e.g., the first cover part 220 of FIG. 13), and a plurality of first bars 330 connected with the first supporting member 310 and the second supporting member 320. The configuration of the first supporting bracket 300, the first supporting member 310, the second supporting member 320, and the first bar 330 of FIGS. 14A, 14B, and 14C may be identical in whole or part to the configuration of the first supporting bracket 260, the first supporting member 262, the second supporting member 264, and the first bar 266 of FIG. 13.

According to certain embodiments, at least a portion of the first supporting bracket 300 is movable using a bar-linkage mechanism. For example, the first supporting bracket 300 may be moved along the first direction D1 using the plurality of first bars 330 connected with the first supporting member 310 and the second supporting member 320 and may adjust the distance between the first supporting member 310 and the second supporting member 320.

According to certain embodiments, the first supporting member 310 may include a fifth end 310a and a sixth end 310b opposite to the fifth end 310a. According to an embodiment, the first supporting member 310 may include a receiving groove 312 for receiving the second supporting member 320 and the plurality of first bars 330. For example, in a state (e.g., FIG. 14A) in which the display (e.g., the display 240 of FIG. 6) is received in the housing (e.g., the housing 210 of FIG. 6), the second supporting member 320 and the plurality of first bars 330 may be positioned in the receive groove 312 of the first supporting member 310. According to an embodiment, the first supporting member 310 may include a protrusion 314 for restricting movement of the second supporting member 320 and/or the plurality of first bars 330. For example, the protrusion 314 of the first supporting member 310 may restrict movement of the second supporting member 320 and/or the plurality of first bars 330 past a line defined by an edge of the first supporting member 310. According to an embodiment, the first supporting member 310 may be integrally formed with the housing 210.

According to certain embodiments, the second supporting member 320 may include a seventh end 320a and an eighth end 320b. According to an embodiment, the second supporting member 320 may support the first end (e.g., the first end 241 of FIG. 10) of the display 240. According to an embodiment, the second supporting member 320 may restrict the movement of the first bar 330. For example, the second supporting member 320 may include a protrusion (not shown) and may restrict movement of the first bar 330 in the first direction D1 past the second supporting member 320.

According to certain embodiments, the first bar 330 may include a plurality of first bars 332, 334, 336, and 338 disposed between the first supporting member 310 and the second supporting member 320. For example, the first bar 330 may include a 1-1th bar 332 rotatably connected to the fifth end 310a, a 1-2th bar 334 rotatably connected with the seventh end 320a, a 1-3th bar 336 rotatably connected with the sixth end 310b, and a 1-4th bar 338 rotatably connected with the eighth end 320b.

According to certain embodiments, the plurality of first bars 332, 334, 336, and 338 may rotate at a plurality of points, thereby adjusting the distance between the housing and/or the first supporting member 310 and the second supporting member 320. According to an embodiment, the 1-1th bar 332 may be rotatably connected with the 1-2th bar 334 with respect to the first point 330a positioned between the fifth end 310a and the seventh end 320a. According to an embodiment, the 1-3th bar 336 may be rotatably connected with the 1-4th bar 338 with respect to the second point 330b positioned between the sixth end 310b and the eighth end 320b. According to an embodiment, the first point 330a may be an end of the 1-1th bar 332 and/or the 1-2th bar 334. The first point 330a may be positioned opposite to the end of the 1-1th bar 332 connected with the fifth end 310a of the first supporting member 310. According to an embodiment, the second point 330b may be an end of the 1-3th bar 336 and/or the 1-4th bar 338. For example, the second point 330b may be positioned opposite to the end of the 1-3th bar 336 connected with the sixth end 310b of the first supporting member 310.

Figure 15A:
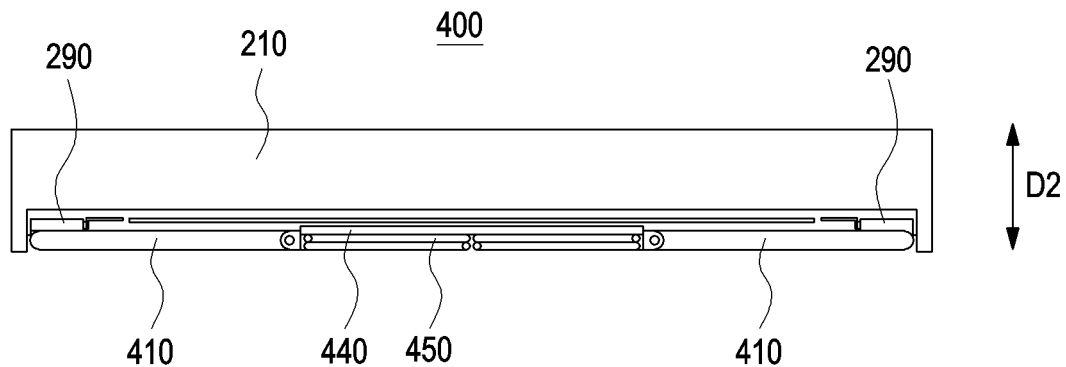
FIGS. 15A, 15B, and 15C are views illustrating a second supporting bracket according to certain embodiments of the disclosure.
Figure 15B:
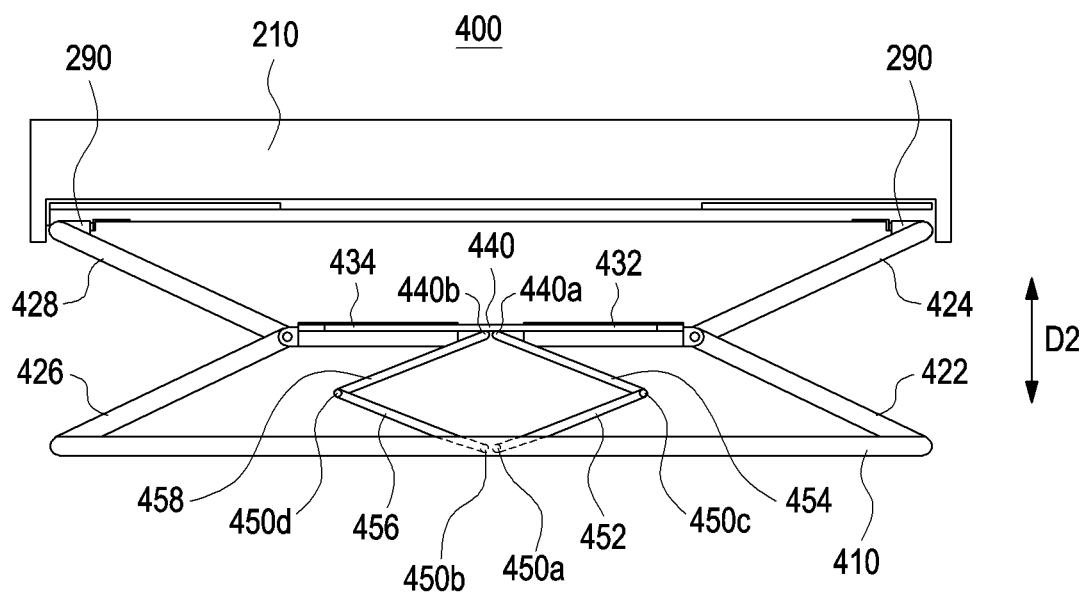
Figure 15C:
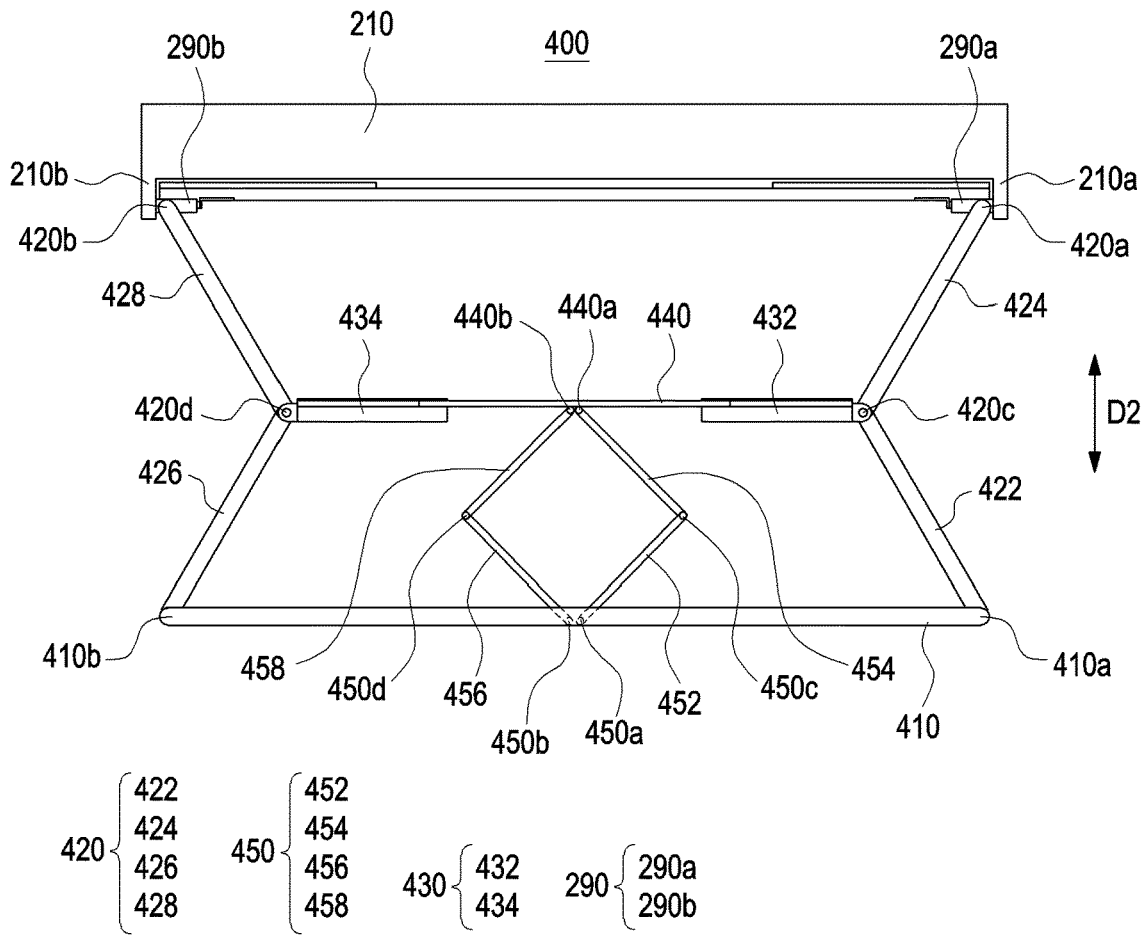

FIGS. 15A, 15B, and 15C are views illustrating a second supporting bracket according to certain embodiments of the disclosure.

Referring to FIGS. 15A, 15B, and 15C, the second supporting bracket 400 may include a third supporting member 410 connected with a second cover part (e.g., the second cover part 230 of FIG. 13) and a plurality of second bars 420 connected with a housing 210 and/or a hinge structure 290. The configuration of the housing 210, the hinge structure 290, the second supporting bracket 400, the third supporting member 410, and the plurality of second bars 420 of FIGS. 15A, 15B, and 15C may be identical in whole or part to the configuration of the housing 210, the hinge structure 290, the second supporting bracket 270, the third supporting member 272, and the plurality of second bars 274 of FIG. 13.

According to certain embodiments, the hinge structure 290 may include a plurality of hinge structures 290a and 290b. For example, the hinge structure 290 may include a first hinge structure 290a adjacent to a first housing end 210a of the housing 210 and a second hinge structure 290b adjacent to a second housing end 210b opposite to the first housing end 210a.

According to certain embodiments, at least a portion of the second supporting bracket 400 is movable using a bar-linkage mechanism. For example, the second supporting bracket 400 may be movable along the second direction D2 using the plurality of second bars 420 connected with the hinge structure 290 and the third supporting member 410 and may adjust the distance between the third supporting member 410 and the housing 210.

According to certain embodiments, the third supporting member 410 may include a ninth end 410a and a tenth end 410b opposite to the ninth end 410a. According to an embodiment, the third supporting member 410 may support the second end (e.g., the second end 243 of FIG. 10) of the display 240.

According to certain embodiments, the second bar 420 may include a plurality of second bars 422, 424, 426, and 428 disposed between the third supporting member 410 and the hinge structure 290. For example, the second bar 420 may include a 2-1th bar 422 rotatably connected to the ninth end 410a, a 2-2th bar 424 rotatably connected to the first hinge structure 290a, a 2-3th bar 426 rotatably connected to the tenth end 410b, and a 2-4th bar 428 rotatably connected to the second hinge structure 290b.

According to certain embodiments, the plurality of second bars 422, 424, 426, and 428 may rotate based on the distance between the third supporting member 410 and the housing 210. According to an embodiment, the 2-1th bar 422 may be rotatably connected to the 2-2th bar 424 with respect to the third point 420c positioned between the first housing end 210a and the ninth end 410a. According to an embodiment, the 2-3th bar 426 may be rotatably connected to the 2-4th bar 428 with respect to the fourth point 420d positioned between the second housing end 210b and the tenth end 410b. According to an embodiment, the third point 420c may be an end of the 2-1th bar 422 or the 2-2th bar 424. For example, the third point 420c may be positioned opposite to the end of the 2-1th bar 422 connected with the ninth end 410a of the third supporting member 410. According to an embodiment, the fourth point 420d may be an end of the 2-3th bar 426 or the 2-4th bar 428. For example, the fourth point 420d may be positioned opposite to the end of the 2-3th bar 426 connected with the tenth end 410b of the third supporting member 410. According to an embodiment, the 2-2th bar 424 may be rotatably connected to the first hinge structure 290a with respect to the fifth point 420a, and the 2-4th bar 428 may be rotatably connected to the second hinge structure 290b with respect to the sixth point 420b.

According to certain embodiments, the second supporting bracket 400 may include a guide member 430 connected with the plurality of second bars 420. According to an embodiment, the guide member 430 may support at least a portion of the second display area (e.g., the second display area 244 of FIG. 13). According to an embodiment, the guide member 430 may include a first guide member 432 connected with the 2-1th bar 422 and/or the 2-2th bar 424 at the third point 420c and a second guide member 434 connected with the 2-3th bar 426 and/or the 2-4th bar 428 at the fourth point 420d. According to an embodiment, the guide member 430 may receive at least a portion of the fourth supporting member 440.

According to certain embodiments, the second supporting bracket 400 may include the fourth supporting member 440, which in turn may be configured to slide within the guide member 430. According to an embodiment, the fourth supporting member 440 may support at least a portion of the second display area (e.g., the second display area 244 of FIG. 13). According to an embodiment, at least a portion of the fourth supporting member 440 may be inserted into the guide member 430. According to an embodiment, as the distance between the third supporting member 410 and the housing 210 increases, a rate at which the fourth supporting member 440 is inserted into the guide member 430 may decrease. According to an embodiment, the fourth supporting member 440 may include connecting portions 440a and 440b connected with the plurality of third bars 450. For example, the fourth supporting member 440 may include a first connecting portion 440a and a second connecting portion 440b extending toward the third supporting member 410.

According to certain embodiments, the second supporting bracket 400 may include a third bar 450 supporting at least a portion of the second display area (e.g., the second display area 244 of FIG. 13). The third bar 450 may include a plurality of third bars 452, 454, 456, and 458 disposed between the third supporting member 410 and the fourth supporting member 440. For example, the third bar 450 may include a 3-1th bar 452 including an end 450a rotatably connected to the third supporting member 410, a 3-2th bar 454 rotatably connected to the fourth supporting member 440 in the first connecting portion 440a, a 3-3th bar 456 including an end 450b rotatably connected to the third supporting member 410, and a 3-4th bar 458 rotatably connected to the fourth supporting member 440 in the second connecting portion 440b.

According to certain embodiments, the plurality of third bars 452, 454, 456, and 458 may rotate based on the distance between the third supporting member 410 and the fourth supporting member 440. According to an embodiment, the 3-1th bar 452 may be rotatably connected to the 3-2th bar 454 with respect to the seventh point 450c positioned between the first connecting portion 440a and the third supporting member 410. According to an embodiment, the 3-3th bar 456 may be rotatably connected to the 3-4th bar 458 with respect to the eighth point 450d positioned between the second connecting portion 440b and the third supporting member 410.

Figure 16:
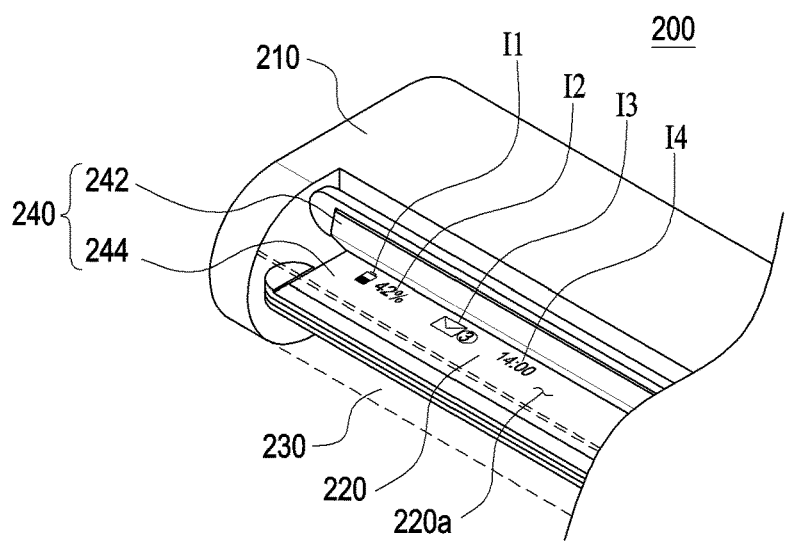
FIG. 16 is a perspective view illustrating a first display area visually exposed through a first cover part according to certain embodiments of the disclosure.

FIG. 16 is a perspective view illustrating a first display area exposed through a first cover part according to certain embodiments of the disclosure.

Referring to FIG. 16, at least a portion of the display 240 may be visually exposed to an exterior of the device through the first cover part 220. For example, the first cover part 220 may include a third surface 220a (e.g., a surface exposed to the outside) forming the exterior of the electronic device 200. The first cover part 220 may be substantially transparent at the third surface 220a, and consequently, at least a portion of the display 240 may be visible from to the exterior of the electronic device 200 through the third surface 220a. The configuration of the housing 210, the first cover part 220, the second cover part 230, and the display 240 of FIG. 16 may be identical in whole or part to the configuration of the housing 210, the first cover part 220, the second cover part 230, and the display 240 of FIGS. 6 to 9.

According to certain embodiments, in a state in which the display 240 is received in the housing 210, a portion (e.g., the first end 241 of FIG. 6) of the first display area 242 may output display information. For example, the display 240 (e.g., the first display area 242 and/or the second display area 244) visually exposed through the first cover part 220 may output indicators representing, for example, a current charge level of the battery (e.g., the battery 189 of FIG. 1), a message notification, and/or a current time. According to an embodiment, the display 240 may output first information icon I1 representing a present charge level relative to an overall capacity of the battery 189 and/or second information icon I2 indicating the numerical ratio of charge to the total capacity of the battery 189. According to an embodiment, the display 240 may output third information icon I3 for representing received messages and, in some embodiments, a number string representing a count of the received messages. According to an embodiment, the display 240 may output fourth information icon I4 reflecting the current time.

According to certain embodiments of the disclosure, an electronic device (e.g., the electronic device 200 of FIG. 2) may include a housing (e.g., the housing 210 of FIG. 3), a roller (e.g., the roller 250 of FIG. 6) disposed in the housing, a first cover part (e.g., the first cover part 220 of FIG. 3) configured to be detachable from the housing, a second cover part (e.g., the second cover part 230 of FIG. 3) configured to be detachable from the housing, and a display (e.g., the display 240 of FIG. 3) including a first display area (e.g., the first display area 242 of FIG. 3) including a first end (e.g., the first end 241 of FIG. 6) coupled with the first cover part and a second display area (e.g., the second display area 244 of FIG. 6) including a second end (e.g., the second end 243 of FIG. 6) coupled with the second cover part. At least a portion of the first display area may be configured to be wound around the roller while facing at least a portion of the second display area.

According to certain embodiments, the electronic device may further include an elastic member including a third end (e.g., the third end 282 of FIG. 8) connected with the display and a fourth end (e.g., the fourth end 284 of FIG. 8) connected with the roller.

According to certain embodiments, the electronic device may further include a first supporting bracket (e.g., the first supporting bracket 260 of FIG. 7) connected with the first cover part and the housing and configured to support the first display area.

According to certain embodiments, the first supporting bracket may include a first supporting member (e.g., the first supporting member 310 of FIG. 14C) connected with the housing and including a fifth end (e.g., the fifth end 310a of FIG. 14C) and a sixth end (e.g., the sixth end 310b of FIG. 14C) opposite to the fifth end, a second supporting member (e.g., the second supporting member 320 of FIG. 14C) connected with the first cover part and including a seventh end (e.g., the seventh end 320a of FIG. 14C) and an eighth end (e.g., the eighth end 320b of FIG. 14C) opposite to the seventh end, and a plurality of first bars (e.g., the first bars 266 of FIG. 13) disposed between the first supporting member and the second supporting member. The plurality of first bars may include a 1-1th bar (e.g., the 1-1th bar 332 of FIG. 14C) rotatably connected to the fifth end, a 1-2th bar (e.g., the 1-2th bar 334 of FIG. 14C) rotatably connected to the seventh end, a 1-3th bar (e.g., the 1-3th bar 336 of FIG. 14C) rotatably connected to the sixth end, and a 1-4th bar (e.g., the 1-4th bar 338 of FIG. 14C) rotatably connected to the eighth end. The 1-1th bar may be rotatably connected to the 1-2th bar with respect to a first point (e.g., the first point 330a of FIG. 14C) positioned between the fifth end and the seventh end, and the 1-3th bar may be rotatably connected to the 1-4th bar with respect to a second point (e.g., the second point 330b of FIG. 14C) positioned between the sixth end and the eighth end.

According to certain embodiments, the electronic device may further include a second supporting bracket (e.g., the second supporting bracket 270 of FIG. 13) connected with the second cover part and the housing and configured to support the second display area.

According to certain embodiments, the electronic device may further include a hinge structure (e.g., the hinge structure 290 of FIG. 8) rotatably connecting the second supporting bracket to the housing.

According to certain embodiments, the hinge structure may include a fixing part (e.g., the fixing part 292 of FIG. 6) disposed on a first surface of the housing configured to face the second cover part and a rotation bracket coupled with the second supporting bracket and configured to rotate about the fixing part.

According to certain embodiments, the second supporting bracket may include a third supporting member (e.g., the third supporting member 410 of FIG. 15C) connected with the second cover part and including a ninth end (e.g., the ninth end 410a of FIG. 15C) and a tenth end (e.g., the tenth end 410b of FIG. 15C) opposite to the ninth end, and a plurality of second bars (e.g., the second bars 420 of FIG. 15C) connected with the hinge structure and the third supporting member.

The hinge structure may include a first hinge structure (e.g., the first hinge structure 290a of FIG. 15C) connected with a first housing end (e.g., the first housing end 210a of FIG. 15C) of the housing and a second hinge structure (e.g., the second hinge structure 290b of FIG. 15C) connected with a second housing end (e.g., the second housing end 210b of FIG. 15C) opposite to the first housing end. The plurality of second bars may include a 2-1th bar (e.g., the 2-1th bar 422 of FIG. 15C) rotatably connected to the ninth end, a 2-2th bar (e.g., the 2-2th bar 424 of FIG. 15C) rotatably connected to the first hinge structure, a 2-3th bar (e.g., the 2-3th bar 426 of FIG. 15C) rotatably connected to the tenth end, and a 2-4th bar (e.g., the 2-4th bar 428 of FIG. 15D) rotatably connected to the second hinge structure. The 2-1th bar may be rotatably connected to the 2-2th bar with respect to a third point (e.g., the third point 420c of FIG. 15C) positioned between the first housing end and the ninth end, and the 2-3th bar may be rotatably connected to the 2-4th bar with respect to a fourth end (e.g., the fourth end 420d of FIG. 15C) positioned between the second housing end and the tenth end. According to certain embodiments, the second supporting bracket may include a guide member (e.g., the guide member 430 of FIG. 15C) connected with the plurality of second bars at the third point and the fourth point, a fourth supporting member (e.g., the fourth supporting member 440 of FIG. 15B) configured to slide within the guide member and a plurality of third bars (e.g., the third bars 450 of FIG. 15C) disposed between the third supporting member and the fourth supporting member.

According to certain embodiments, at least a portion of the first display area may be visually exposed through the first cover part.

According to certain embodiments, the electronic device may further include a spring structure (e.g., the spring structure 254 of FIG. 10) to provide an elastic force to the roller in a direction in which the display is inserted into the housing, and a damping member (e.g., the damping member 256 of FIG. 10) connected with the roller to provide a braking force for reducing the elastic force of the spring structure.

According to certain embodiments, the roller may include a plurality of end areas (e.g., the end areas 250b of FIG. 5) including a plurality of protrusions (e.g., the protrusions 252 of FIG. 6) and a central area (e.g., the central area 250a of FIG. 5) positioned between the plurality of end areas and facing the display. The electronic device may further include a stopper structure (e.g., the stopper structure 258 of FIG. 10) configured to contact the plurality of protrusions.

According to certain embodiments, the electronic device may further include an input structure (e.g., the input structure 214 of FIG. 10) at least partially exposed to an outside of the housing and connected with the stopper structure. The input structure may be configured to change a position of the stopper structure with respect to the plurality of protrusions based on a user input.

According to certain embodiments, the first cover part may be configured to be detachable from the housing in a first direction (e.g., the first direction D1 of FIG. 7), and the second cover part may be configured to be detachable from the housing in a second direction (e.g., the second direction D2 of FIG. 7) different from the first direction.

According to certain embodiments, the display may include a third display area (e.g., the third display area 246 of FIG. 7) positioned between the first display area and the second display area. The roller may include a receiving groove (e.g., the receiving groove 253 of FIG. 11) for receiving the third display area.

According to certain embodiments of the disclosure, an electronic device (e.g., the electronic device 200 of FIG. 2) may include a housing (e.g., the housing 210 of FIG. 2), a roller (e.g., the roller 250 of FIG. 6) disposed in the housing, a first cover part (e.g., the first cover part 220 of FIG. 7) configured to be detachable from the housing in a first direction (e.g., the first direction D1 of FIG. 7), a second cover part (e.g., the second cover part 230 of FIG. 7) configured to be detachable from the housing in a second direction different from the first direction, and a display (e.g., the display 240 of FIG. 7) including a first display area (e.g., the first display area 242 of FIG. 6) including a first end (e.g., the first end 241 of FIG. 6) coupled with the first cover part and a second display area (e.g., the second display area 244 of FIG. 6) including a second end (e.g., the second end 243 of FIG. 6) coupled with the second cover part and configured to be wound around the roller.

According to certain embodiments, a first front surface (e.g., the first front surface 242a of FIG. 3) of the first display area and a second front surface (e.g., the second front surface 244a of FIG. 3) of the second display area may be configured to be wound around the roller while facing each other.

According to certain embodiments, the electronic device may further include an elastic member (e.g., the elastic member 280 of FIG. 8) including a third end (e.g., the third end 282 of FIG. 8) connected with the display and a fourth end (e.g., the fourth end 284 of FIG. 8) connected with the roller.

According to certain embodiments, the electronic device may further include a first supporting bracket (e.g., the first supporting bracket 260 of FIG. 7) connected with the first cover part and the housing and configured to support the first display area.

According to certain embodiments, the electronic device may further include a second supporting bracket (e.g., the second supporting bracket 270 of FIG. 7) connected with the second cover part and the housing and configured to support the second display area.

It is apparent to one of ordinary skill in the art that an electronic device including various rollers according to the disclosure are not limited to the above-described embodiments and those shown in the drawings, and various changes, modifications, or alterations may be made thereto without departing from the present disclosure.

The invention claimed is:

1. An electronic device, comprising:
a housing;
a roller disposed in the housing;
a first cover part that is detachable from the housing;
a second cover part that is detachable from the housing; and
a display including a first display area and a second display area,
the first display area including a first end coupled with the first cover part, and
the second display area including a second end coupled with the second cover part,
wherein the display is configured to be wound around the roller while being folded at a position between the first display area and the second display area such that at least a portion of the first display area face at least a portion of the second display area in the housing.

2. The electronic device of claim 1, further comprising an elastic member including a third end connected with the display, and a fourth end connected with the roller.

3. The electronic device of claim 1, further comprising a first supporting bracket connected with the first cover part and the housing, the first supporting bracket configured to support the first display area.

4. The electronic device of claim 3, wherein the first supporting bracket includes:
a first support member connected with the housing and including a fifth end and a sixth end opposite to the fifth end,
a second support member connected with the first cover part, and including a seventh end and an eighth end opposite to the seventh end, and
a plurality of first bars disposed between the first support member and the second support member, wherein the plurality of first bars includes:
a 1-1th bar rotatably connected to the fifth end, a 1-2th bar rotatably connected to the seventh end, a 1-3th bar rotatably connected to the sixth end, and a 1-4th bar rotatably connected to the eighth end, and
wherein the 1-1th bar is rotatably connected to the 1-2th bar with respect to a first point between the fifth end and the seventh end, and the 1-3th bar is rotatably connected to the 1-4th bar with respect to a second point between the sixth end and the eighth end.

5. The electronic device of claim 1, further comprising a second supporting bracket connected with the second cover part and the housing, the second support bracket configured to support the second display area.

6. The electronic device of claim 5, further comprising a hinge structure rotatably connecting the second supporting bracket to the housing.

7. The electronic device of claim 6, wherein the hinge structure includes,
a fixing part disposed on a first surface of the housing configured to face the second cover part and
a rotation bracket coupled with the second supporting bracket, and configured to rotate about the fixing part.

8. The electronic device of claim 6, wherein the second supporting bracket includes:
a third support member connected with the second cover part, and including a ninth end and a tenth end opposite to the ninth end, and
a plurality of second bars connected with the hinge structure and the third support member,
wherein the hinge structure includes a first hinge structure connected with a first housing end of the housing, and a second hinge structure connected with a second housing end opposite to the first housing end, wherein the plurality of second bars include:

a 2-1th bar rotatably connected to the ninth end, a 2-2th bar rotatably connected to the first hinge structure, a 2-3th bar rotatably connected to the tenth end, and a 2-4th bar rotatably connected to the second hinge structure, and wherein the 2-1th bar is rotatably connected to the 2-2th bar with respect to a third point between the first housing end and the ninth end, and the 2-3th bar is rotatably connected to the 2-4th bar with respect to a fourth point between the second housing end and the tenth end.

9. The electronic device of claim 8, wherein the second supporting bracket includes:

a guide member connected with the plurality of second bars at the third point and the fourth point, a fourth support member configured to slide within the guide member and a plurality of third bars disposed between the third support member and the fourth support member.

10. The electronic device of claim 1, wherein at least a portion of the first display area is exposed as to be visible through the first cover part.

11. The electronic device of claim 1, further comprising:

a spring structure providing an elastic force to the roller in a direction in which the display is inserted into the housing; and a damping member connected with the roller to provide a braking force for reducing the elastic force provided by the spring structure.

12. The electronic device of claim 1, wherein the roller includes a plurality of end areas including a plurality of protrusions, and a central area positioned between the plurality of end areas, the central area oriented as to face the display, and wherein the electronic device further includes a stopper structure configured to contact the plurality of protrusions.

13. The electronic device of claim 12, further comprising an input structure at least partially exposed to an exterior of the housing, and connected with the stopper structure, wherein the input structure is configured to change a position of the stopper structure with respect to the plurality of protrusions based on a user input.

14. The electronic device of claim 1, wherein the first cover part is detachable from the housing in a first direction, and wherein the second cover part is detachable from the housing in a second direction different from the first direction.

15. The electronic device of claim 1, wherein the display includes a third display area between the first display area and the second display area, and wherein the roller includes a receiving groove for receiving the third display area of the display.

* * * * *